(12) United States Patent
Tanaka et al.

(10) Patent No.: US 8,402,195 B2
(45) Date of Patent: Mar. 19, 2013

(54) STORAGE SYSTEM MOUNTED WITH PLURALITY OF PROCESSORS

(75) Inventors: Katsuya Tanaka, Kokubunji (JP); Shuji Nakamura, Kanagawa (JP); Emi Nakamura, legal representative, Hino (JP)

(73) Assignee: Hitachi, Ltd., Tokyo (JP)

( * ) Notice: Subject to any disclaimer, the term of this patent is extended or adjusted under 35 U.S.C. 154(b) by 457 days.

(21) Appl. No.: 12/668,761

(22) PCT Filed: Oct. 27, 2009

(86) PCT No.: PCT/JP2009/005659
§ 371 (c)(1),
(2), (4) Date: Jan. 12, 2010

(87) PCT Pub. No.: WO2011/052002
PCT Pub. Date: May 5, 2011

(65) Prior Publication Data
US 2011/0252176 A1    Oct. 13, 2011

(51) Int. Cl.
*G06F 13/20* (2006.01)
(52) U.S. Cl. ........................................ 710/313
(58) Field of Classification Search .............. 710/313
See application file for complete search history.

(56) References Cited

U.S. PATENT DOCUMENTS

| | | | | |
|---|---|---|---|---|
| 7,562,176 | B2* | 7/2009 | Kloeppner et al. | 710/314 |
| 7,653,773 | B2* | 1/2010 | Larson et al. | 710/313 |
| 7,705,850 | B1* | 4/2010 | Tsu | 345/501 |
| 7,913,024 | B2* | 3/2011 | Brown et al. | 710/313 |
| 8,108,584 | B2* | 1/2012 | Harriman | 710/313 |
| 2007/0183393 | A1 | 8/2007 | Boyd et al. | |
| 2008/0147937 | A1 | 6/2008 | Freimuth et al. | |
| 2008/0147938 | A1* | 6/2008 | Freimuth et al. | 710/105 |
| 2009/0276773 | A1* | 11/2009 | Brown et al. | 718/1 |

FOREIGN PATENT DOCUMENTS

| | | |
|---|---|---|
| EP | 1 909 167 A2 | 4/2008 |
| JP | 2008-152787 A | 7/2008 |
| WO | 2009/120798 A2 | 10/2009 |

* cited by examiner

*Primary Examiner* — Paul R Myers
*Assistant Examiner* — Christopher a Daley
(74) *Attorney, Agent, or Firm* — Mattingly & Malur, PC

(57) ABSTRACT

A storage system 10 enables control by more processors 201 in accordance with reducing the resource size required per EP in a communication network to which MR-IOV is applied. The storage system 10 includes a plurality of processors 201 and a plurality of CMs 209. The internal network of the storage system 10 is configured such that each processor 201 is able to dual-write write data to a CM 209 in a FE-CM data transfer, and to transfer the write data from one of the dual-write CMs 209 to the BE in a CM-BE data transfer.

13 Claims, 28 Drawing Sheets

Fig.7

| RP \ EP | 1 FE | 3 CM1 | 4 CM1 | 5 CM2 | 6 CM2 | 2 BE |
|---|---|---|---|---|---|---|
| 1 | X | X |   | X |   |   |
| 2 |   |   | X |   |   | X |
| 3 | X | X |   | X |   |   |
| 4 |   |   |   |   | X | X |

400

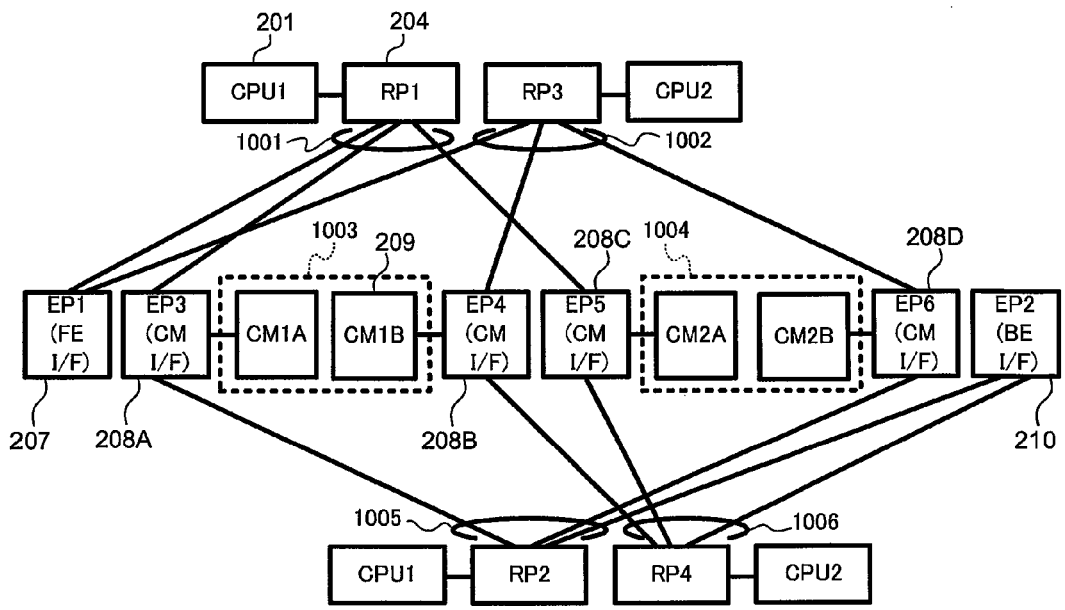

Fig.13

| EP\RP | 1 FE | 3 CM1 | 4 CM1 | 5 CM2 | 6 CM2 | 7 CM3 | 8 CM3 | 9 CM4 | 10 CM4 | 2 BE |
|---|---|---|---|---|---|---|---|---|---|---|
| 1 | X | X |  |  |  | X |  |  |  |  |
| 2 |  |  | X |  |  |  |  |  | X | X |
| 3 | X |  |  | X |  |  |  | X |  |  |
| 4 |  |  |  |  | X |  | X |  |  | X |
| 5 | X | X |  |  |  | X |  |  |  |  |
| 6 |  |  | X |  |  |  |  |  | X | X |
| 7 | X |  |  | X |  |  |  | X |  |  |
| 8 |  |  |  |  | X |  | X |  |  | X |

400

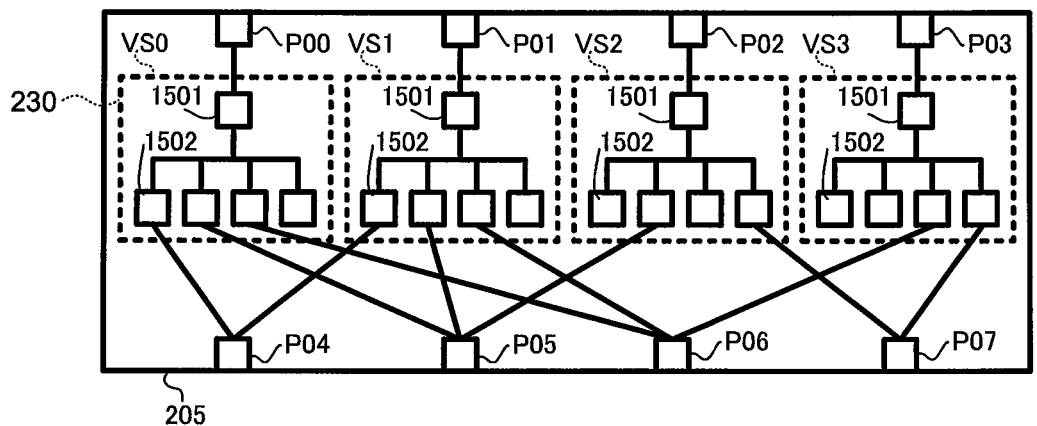

Fig.20

|  EP\RP | 1 FE | 3 CM1 | 4 CM2 | 2 BE |
|---|---|---|---|---|
| 1 | X | X | X |  |
| 2 | X | X | X |  |
| 3 |  | X |  | X |
| 4 |  |  | X | X |

| EP\RP | 1 FE | 3 CM1 | 4 CM2 | 5 CM3 | 6 CM4 | 2 BE |
|---|---|---|---|---|---|---|
| 1 | X | X | X | X | X | X |
| 2 | X | X | X | X | X | X |
| 3 | X | X | X | X | X | X |
| 4 | X | X | X | X | X | X |
| 5 |   |   |   |   |   |   |
| 6 |   |   |   |   |   |   |

| EP\RP | 1 FE | 3 CM1 | 4 CM2 | 5 CM3 | 6 CM4 | 2 BE |
|---|---|---|---|---|---|---|
| 1 | X | X | X | X | X | X |
| 2 | X | X |   | X |   |   |
| 3 | X | X | X | X | X | X |
| 4 | X |   | X |   | X |   |
| 5 |   |   | X |   | X | X |
| 6 |   |   | X | X |   | X |

AUGMENTED RP { rows 5, 6 }

| RP\EP | 1 FE | 3 CM1 | 4 CM2 | 5 CM3 | 6 CM4 | 2 BE |
|---|---|---|---|---|---|---|
| 1 | X |  | X |  | X |  |
| 2 | X | X |  | X |  |  |
| 3 | X | X |  | X |  |  |
| 4 | X |  | X |  | X |  |
| 5 |  | X |  |  | X | X |
| 6 |  |  | X | X |  | X |
| 7 |  | X |  |  | X | X |
| 8 |  |  | X | X |  | X |

AUGMENTED RP { 7, 8 }

| RP\EP | 1 FE | 3 CM1 | 4 CM2 | 5 CM3 | 6 CM4 | 2 BE |
|---|---|---|---|---|---|---|
| 1 | X | X |  | X |  |  |
| 2 |  | X |  |  | X | X |
| 3 | X |  | X |  | X |  |
| 4 |  |  | X | X |  | X |

Fig.35

| EP / RP | 1 FE | 3 CM1 | 4 CM2 | 5 CM3 | 6 CM4 | 2 BE |
|---|---|---|---|---|---|---|
| 1 | X | X |   | X |   |   |
| 2 |   | X |   |   | X | X |
| 3 | X |   | X |   | X |   |
| 4 |   |   | X | X |   | X |
| 5 | X | X |   | X |   |   |
| 6 |   | X |   |   | X | X |

AUGMENTED RP { 5, 6 }

Fig.36

| EP / RP | 1 FE | 3 CM1 | 4 CM2 | 5 CM3 | 6 CM4 | 2 BE |
|---|---|---|---|---|---|---|
| 1 | X | X |   | X |   |   |
| 2 |   | X |   |   | X | X |
| 3 | X |   | X |   | X |   |
| 4 |   |   | X | X |   | X |
| 5 | X | X |   | X |   |   |
| 6 |   | X |   |   | X | X |
| 7 | X |   | X |   | X |   |
| 8 |   |   | X | X |   | X |

AUGMENTED RP { 7, 8 }

STORAGE SYSTEM MOUNTED WITH PLURALITY OF PROCESSORS

TECHNICAL FIELD

The present invention generally relates to a storage system, and more particularly to the internal network of a storage system mounted with a plurality of processors and a method for augmenting the processors.

BACKGROUND ART

A storage system generally comprises a controller and a randomly accessible nonvolatile recording medium. This recording medium, for example, is a disk array comprising a plurality of hard disk drives (HDD) or nonvolatile solid state drives (SSD). The controller, for example, comprises a front-end interface (hereinafter "FEIF") for connecting to a higher-level device (a host system or the like), a back-end interface (hereinafter "BEIF") for connecting to the disk array, and a cache memory (hereinafter "CM") for temporarily storing data that the higher-level device writes/reads to/from the disk array. In addition, the controller comprises a processor for controlling the transfer of data between the higher-level device and the CM, and between the disk array and the CM. "PCI Express" is known as a communication network standard for connecting the processor, FEIF and BEIF. Also, a "Multi-Root I/O Virtualization and Sharing Specification" (hereinafter "MR-IOV"), which is a standard for a plurality of processors to share an I/O device, is known as a PCI Express expansion standard. For example, Patent Literature 1 discloses technology related to a communication network in a case that applies MR-IOV.

In MR-IOV, for example, the communication network is configured from a plurality of root complexes (hereinafter "RC") to which processors are connected, a plurality of root ports (hereinafter "RP") included in the RC, a plurality of endpoints (hereinafter "EP"), which are the base points of data input/output, and a plurality of switches for connecting the RP and the EP. Then, the respective EPs are configured so as to enable the provision (so as to enable the processor to control the transfer of data over these EPs) of a function (a data transfer function that transfers inputted data to another device) to each processor that accesses the EP via the RP. In accordance with a configuration like this, a plurality of processors are able to share the respective EPs, and are each able to independently access the EP via the RP (are each able to independently control the transfer of data over the EP). In accordance with this, it is possible for a plurality of processors to independently carry out data transfer operations without increasing the number of EPs, thereby enhancing data transfer processing performance.

Focusing on one RP in the MR-IOV, a tree topology configured from this RP and the EPs and switches logically connected to this RP is called a "virtual hierarchy" (hereinafter "VH"). In a communication network that conforms to the MR-IOV (hereinafter "MR-IOV network"), the same number of VHs as the plurality of RPs exists inside this MR-IOV network. One VH represents the data transfer address space controlled for each RP by a single processor.

For example, it is supposed that a first VH configured from a RP1, a EP1 and a EP2, and a second VH configured from a RP2, the EP1 and the EP2 exist inside the MR-IOV network. Then, it is supposed that the RP1 is disposed in a RC1, to which a processor 1 is connected, and that the RP2 is disposed in a RC2, to which a processor 2 is connected. In accordance with this, the processor 1 is able to independently control a data transfer from the EP1 to the EP2 (or vice versa) by way of the RP1 on the first VH, and the processor 2 is able to independently control a data transfer from the EP1 to the EP2 (or vice versa) by way of the RP2 on the second VH.

CITATION LIST

Patent Literature

[PTL 1]
Japanese Patent Application Laid-open No. 2008-152787

SUMMARY OF INVENTION

Technical Problem

As is clear from the above example, in a case where a plurality of VHs having the EPs as components (EP-supported VH) exist, the EPs (in the above example, EP1 and EP2) are shared between these plurality of VHs (in the above example, the first VH and the second VH). That is, in the MR-IOV, each EP must provide its function (data transfer function) to each of the one or more VHs that it supports. Here, to enable the EP to provide one data transfer function, a resource (for example, a control logic circuit or a buffer) of a prescribed size is required. For this reason, the more VHs the EP supports, the more data transfer function-required resources the EP must comprise. In other words, the number of VHs capable of being supported by the EP is equivalent to the number of resources that this EP comprises.

In the internal network of the storage system, a data transfer between the FE (front-end) and the BE (back-end) is carried out by way of the CM. Specifically, the processor of the storage system performs a FE-BE data transfer by controlling data transfers between the FE and the CM and between the CM and the BE. For this reason, in a case where the MR-IOV is applied to the internal network of the storage system, normally a CMIF (cache memory interface), which is in charge of CM input/output, must support all the VHs in which data transfers are controlled by the respective processors in order for all the processors inside the storage system to be able to control the transfer of data.

A specific example will be explained. For example, it is supposed that a first VH configured from a RP1, an EP1 (equivalent to the FEIF) and a EP3 (equivalent to the CMIF), a second VH configured from a RP2, an EP2 (equivalent to the BEIF) and the EP3, a third VH configured from a RP3, the EP1 and the EP3, and a fourth VH configured from a RP4, the EP2 and the EP3 exist in the internal network of the storage system. Then, it is supposed that the RP1 and the RP2 are included in a RC1 to which a processor 1 is connected, and that the RP3 and the RP4 are included in a RC2 to which a processor 2 is connected. In this example, the processor 1 is able to control the transfer of data between the EP1 and the EP3 by way of the RP1 over the first VH. Further, the processor 1 is able to control the transfer of data between the EP3 and the EP2 by way of the RP2 over the second VH. Further, the processor 2 is able to control the transfer of data between the EP1 and the EP3 by way of the RP3 over the third VH. Further, the processor 2 is able to control the transfer of data between the EP3 and the EP2 by way of the RP4 over the fourth VH. In this case, in order for both the processor 1 and the processor 2 to be able to carry out the control of a data transfer between the EP1 and the EP2 by way of the EP3, the EP3 must support all of the VHs (the first through the fourth VHs). In other words, the EP3 must be configured so as to be accessible from all of the RPs (RP1 through RP4). By contrast, the other EPs (EP1 and EP2) may each support two VHs (EP1 may support the first VH and the third VH, and EP2 may support the second VH and the fourth VH).

In a case where the MR-IOV is applied to the internal network of the storage system like this, a data transfer is carried out via the CM, and therefore the number of VHs that the CMIF must support is larger than that of the other EPs. Then, as mentioned above, the more VHs the EP supports, the more data transfer function-required resources the EP must comprise. For this reason, in a case where control by a larger number of processors is desirable, there arises the problem of insufficient CMIF resources creating a bottleneck, making it impossible to mount the required number of processors.

Generally speaking, a CMIF or other such interface device constituting an EP is realized by a semiconductor integrated circuit, but since there are limits on the size of this circuit, it is important to reduce the size of the resource required per EP.

Therefore, an object of the present invention is to enable control by more processors in accordance with reducing the resource size required per EP in a communication network that applies MR-IOV.

Solution to Problem

A plurality of processors and a plurality of CMs are disposed in the storage system. The internal network of the storage system is configured such that the respective processors are able to carry out dual writing of write data to a plurality of CMs in a FE-CM data transfer, and to transfer to the BE the write data from one of the dual-write CMs in a CM-BE data transfer.

The controller comprises a processor, and the processor may perform processing by executing a computer program. The computer program may be installed from a remote server, or may be installed from a storage medium (for example, a portable storage medium, such as a flash memory, or a CD-ROM or DVD (Digital Versatile Disk). At least a portion of the controller may be realized by a hardware circuit.

BRIEF DESCRIPTION OF DRAWINGS

FIG. 7 is a diagram showing an example of the mapping table pertaining to the storage system related to the second example.

FIG. 9 is a diagram showing an example of the mapping table pertaining to the storage system related to the third example.

FIG. 10 is a diagram illustrating operations at the time of a data write in the storage system related to the third example.

FIG. 11 is a diagram showing another example of the mapping table pertaining to the storage system related to the third example.

FIG. 13 is a diagram showing an example of the mapping table pertaining to the storage system related to the fourth example.

FIG. 17 is a diagram showing the internal configuration of a switch in a case where the CPU3 and a CPU4 have been added in the augmentation method related to the fifth example.

FIG. 18 is a diagram showing an initialized mapping table in the augmentation method related to the fifth example.

FIG. 19 is a diagram showing the mapping table in a case where a CPU3 has been added in the augmentation method related to the fifth example.

FIG. 20 is a diagram showing the mapping table in a case where the CPU3 and a CPU4 have been added in the augmentation method related to the fifth example.

FIG. 31 is a diagram showing an initialized mapping table in the augmentation method related to the sixth example.

FIG. 32 is a diagram showing the mapping table in a case where a CPU3 has been added in the augmentation method related to the sixth example.

FIG. 33 is a diagram showing the mapping table in a case where the CPU3 and a CPU4 have been added in the augmentation method related to the sixth example.

FIG. 34 is a diagram showing an initialized mapping table in an augmentation method related to a seventh example.

FIG. 35 is a diagram showing the mapping table in a case where a CPU3 has been added in the augmentation method related to the seventh example.

FIG. 36 is a diagram showing the mapping table in a case where the CPU3 and a CPU4 have been added in the augmentation method related to the seventh example.

DESCRIPTION OF EMBODIMENTS

Figure 1:
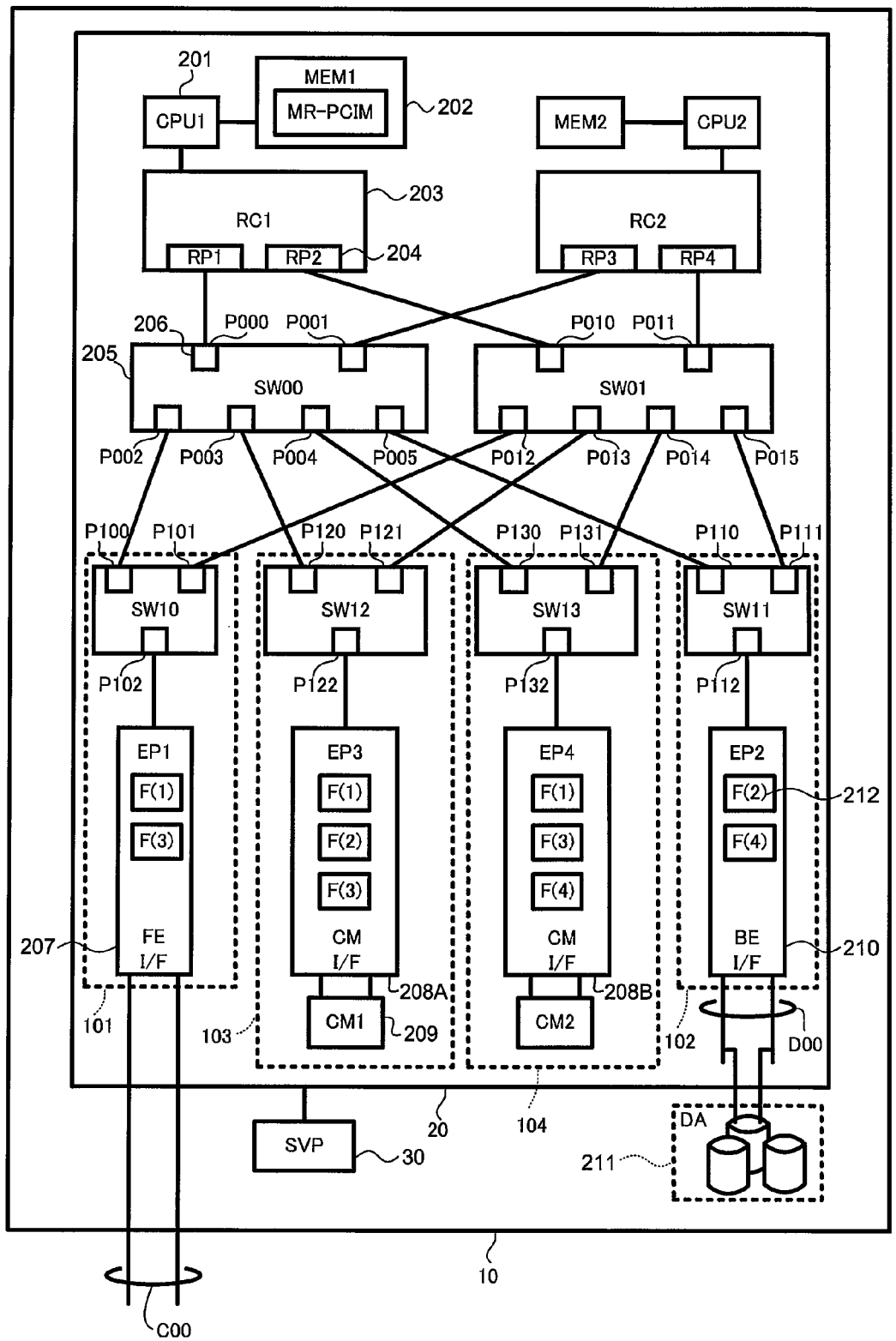
FIG. 1 is a diagram showing an example of the configuration of a storage system related to a first example.

A number of examples of the present invention will be explained below while referring to the drawings. Furthermore, it is supposed that components having the same reference signs are substantially the same in all the examples.

Example 1

The configuration of a storage system 10 related to a first example and the operation thereof will be explained by referring to FIGS. 1 through 5. In the first example, the storage system 10 is configured as in FIG. 1. The processor 201 of the controller 20 of the storage system 10, based on the mapping table shown in FIG. 2, carries out the dual writing of write data (data for which a write has been requested to the storage system 10) from the FEIF (front-end interface) 207 to the two CMs (cache memories) 209 as shown in FIG. 3. The processor 201 also transfers the write data to the BEIF (back-end interface) 210 from one of the two CMs 209 to which dual writing has been performed. The first example will be explained in detail below.

Figures 2, 3:
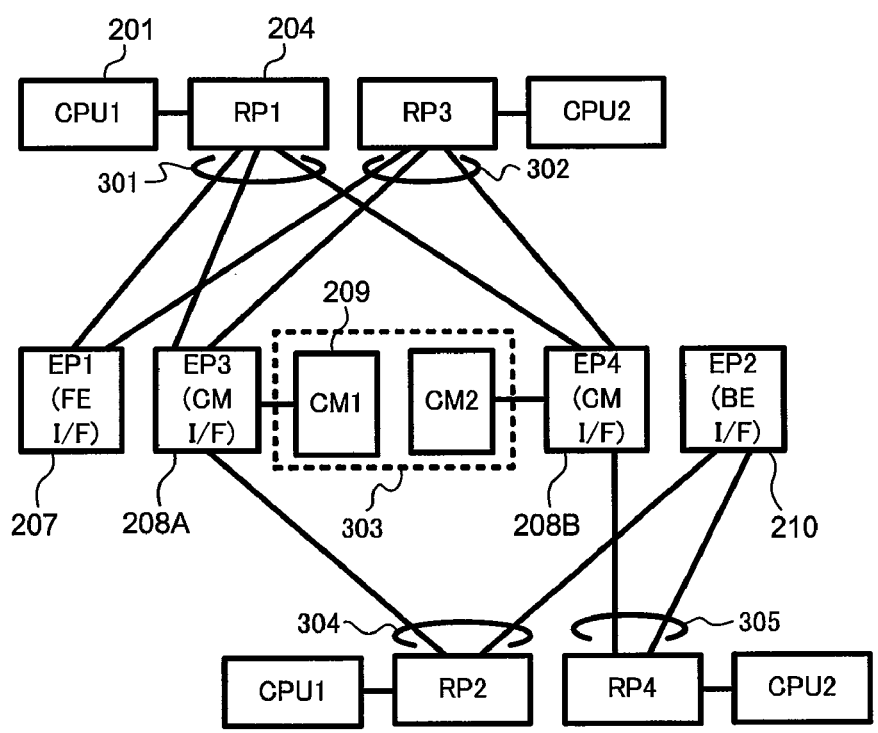
FIG. 2 is a diagram showing an example of a mapping table pertaining to the storage system related to the first example.
FIG. 3 is a diagram illustrating operations at the time of a data write in the storage system related to the first example.

FIG. 1 is a diagram showing an example of the configuration of the storage system 10 related to the first example.

The storage system 10, for example, comprises a controller 20, and a DA (disk array) 211. The DA 211, for example, is configured from a group of storage devices, such as a plurality of HDDs (hard disk drives) or solid state drives. An external higher-level device (for example, a host system) is connected via a channel C00 to the controller 20. A SVP 30, which is a maintenance terminal, is also connected to the controller 20.

The controller 20, for example, comprises two processors 201 (CPU1, CPU2), two memories 202 (MEM1, MEM2), two RC (root complexes) 203 (RC1, RC2), four EPs (endpoints) (EP1, EP2, EP3, EP4), two CMs 209 (CM1, CM2), and a plurality of (six in this example) switches 205 (SW00, SW01, SW10, SW11, SW12, SW13). The four EPs correspond to one FEIF 207, two CMIF (CM interfaces) 208A, 208B, and one BEIF 210. The internal network of the controller 20 is configured in accordance with a plurality of interconnected switches 205 (a PCI Express fabric). Furthermore, the number of components configuring the controller 20 is not limited to the example shown in FIG. 1.

The processors 201 carry out a variety of processing in accordance with executing various computer programs that are stored in the memories 202 (MEM1 for CPU1, and MEM2 for CPU2). For example, the processors 201 control the transfer of data between the higher-level device and the DA 211. The various computer programs executed by the processors 201, and the various table information referenced by the processors 201 are stored in the memories 202.

The Administrator is able to either set or change the values of the table information. The Administrator, for example, is able to perform work, such as the management or maintenance of the storage system 10, to include setting the table information by operating the SVP 30. In a case where the Administrator operates the SVP 30 to set the table information, the Administrator inputs the information that will be set in the table information (the setting information) into the SVP 30. The SVP 30, which receives the input, sends the inputted setting information to the processor 201 via a management network (not shown in the drawing) inside the controller 20. The processor 201, which receives the setting information, either sets or changes the targeted table information on the basis of the received setting information.

The RC1 is connected to the CPU1. The RC1 comprises two RPs (root ports) 204 (RP1, RP2). The RP 204 is either a root port that conforms to the PCI Express specification, or a MRA RP (Multi-Root Aware Root Port) that conforms to the MR-IOV specification. Further, the RC2 is connected to the CPU2. The RC2 comprises two RPs 204 (RP3, RP4).

The RP1 is connected to the EP1 (FEIF 207) via SW00 and SW10. Further, the RP1 is connected to the EP2 (BEIF 210) via SW00 and SW11. The RP1 is also connected to the EP3 (CMIF 208A) via SW00 and SW12. Furthermore, the RP1 is connected to the EP4 (CMIF 208B) via SW00 and SW13.

The RP2 is connected to the EP1 via SW01 and SW10. Further, the RP2 is connected to the EP2 via SW01 and SW11. The RP2 is also connected to the EP3 via SW01 and SW12. Furthermore, the RP2 is connected to the EP4 via SW01 and SW13.

The RP3 is connected to the EP1 via SW00 and SW10. Further, the RP3 is connected to the EP2 via SW00 and SW11. The RP3 is also connected to the EP3 via SW00 and SW12. Furthermore, the RP3 is connected to the EP4 via SW00 and SW13.

The RP4 is connected to the EP1 via SW01 and SW10. Further, the RP4 is connected to the EP2 via SW01 and SW11. The RP4 is also connected to the EP3 via SW01 and SW12. Furthermore, the RP4 is connected to the EP4 via SW01 and SW13.

Each of the switches 205 is a switch (MRA (Multi-Root Aware) switch) that conforms to the MR-IOV (Multi-Root I/O Virtualization and Sharing) specification. Further, the EP (FEIF 207, CMIF 208, BEIF 210) is a device (MRA device) that conforms to the MR-IOV specification. The RC 203 and the EP are connected via two tiers of switches 205. SW00 and SW01 are disposed on the RC 203 side. SW10, SW11, SW12 and SW13 are disposed on the EP side.

The SW00, for example, comprises ports 206 (P000 through P005) for connecting to another component, and a management port (not shown in the drawing) for connecting to the management network inside the controller 20. The SW01, for example, comprises ports 206 (P010 through P015) and a management port (not shown in the drawing). For example, the SVP 30 is connected to the management ports of the SW00 and the SW01.

The SW10, for example, comprises ports 206 (P100 through P102). The SW11, for example, comprises ports 206 (P110 through P112). The SW12, for example, comprises ports 206 (P120 through P122). The SW13, for example, comprises ports 206 (P130 through P132). The SW10, the SW11, the SW12 and the SW13 each comprise a management port like the SW00 and the SW01, and, for example, the SVP 30 is connected to this management port.

The FEIF 207, which is equivalent to the EP1, is connected to the higher-level device via the channel C00. The higher-level device, for example, is a computer for issuing an I/O request (either a write request or a read request) to the storage system 10. The FEIF 207 reciprocally converts the data transfer protocol used on the channel C00 and the data transfer protocol used on the internal network inside the controller 20.

Furthermore, the EP1 and the SW10 may be collectively implemented as a single component 101.

The EP1 comprises a function unit 212 (F (1) on EP1) accessible from the RP1, and a function unit 212 (F (3) on EP1) accessible from the RP3. As used here, "function unit" refers to a module (either a firmware module or a hardware module) for realizing the function (data transfer function) of the EP comprising this function unit. In the drawing, the boxes described inside the respective EPs (the boxes containing the character string F (n) (where n is an integer greater than 0)) correspond to the function units 212. A "Function" stipulated by the PCI Express specification is included in the function unit 212. Further, "access the function unit" refers to accessing the function unit 212 and using the function realized in accordance with this function unit 212 to control a data transfer. Furthermore, in this example, this access is expressed as "the RP accesses the function unit", but in actuality, the processor 201 connected to the RC203 comprising the RP 204 accesses the function unit 212 (controls a data transfer) by way of this RP 204.

The EP uses one function unit 212 to provide one data transfer function. Therefore, the EP is only able to provide a number of data transfer functions equivalent to the number of function units 212 disposed therein. A resource (for example, a control logic circuit or a buffer, hereinafter referred to as the "function resource") needed for providing one data transfer function is allocated to each function unit 212. As mentioned above, in the MR-IOV, each EP must provide this function for each VH (virtual hierarchy) that it supports.

For this reason, each EP must comprise a number of function units 212 equivalent to the number of VHs it supports (hereinafter, "number of supported VHs"). Therefore, each EP must comprise enough function resources to be allocated to each function unit 212 of the number of supported VHs.

In this and the other examples, as shown in parentheses above, the function unit 212 will be expressed as "F (n) on EPX" (in the drawing, the function unit 212 is expressed simply as "F (n)" to clarify which function unit 212 is inside the EP). The "EPX" is the name of the EP (EP1, EP2, and so forth) that comprises this function unit 212. The "n" in the "F (n)" denotes an identifier for uniquely specifying the VH (the VH to which this function unit 212 belongs) that has the RP 204 capable of accessing this function unit 212 as its root port. Furthermore, in this and the other examples, the identifier for uniquely specifying the VH (hereinafter, the "VH identifier"), corresponds to the number of the RP 204 of the VH denoted by this VH identifier. That is, the VH identifier of the VH for which this RP 204 is RP1 is "1".

Incidentally, in the MR-IOV specification, a VH number is stipulated as the number assigned to the VH, but the VH number is the number that is uniquely assigned inside a link (the connection between the switch 205 and the EP, between the switches 205, and so forth). Therefore, the VH number assigned to the same VH may differ for each link (that is, the same VH number does not necessary denote the same VH). Further, in the MR-IOV specification, the VH number assigned to the VH is a consecutive number (normally beginning from "0"). For example, in a case where two VH, a first VH and a second VH, exist on a certain link, "0" is assigned to the first VH as the VH number, and "1" is assigned to the second VH as the VH number (or "1" is assigned to the first VH as the VH number, and "0" is assigned to the second VH as the VH number). Therefore, in a case where a VH having a VH number of "3" exists, a VH with a VH number of "0", a VH with a VH number of "1", and a VH with a VH number of "2" will always exist in addition to this VH with the VH number of "3".

In this and the other examples, in order to make the explanation easier to understand, the VH will be specified by using the above-mentioned VH identifier without making use of the VH number stipulated by the MR-IOV specification. As described above, the VH identifier is able to uniquely specify a VH since the same VH identifier is assigned to the same VH even when the link is different. Further, the VH identifier is not always assigned a consecutive number. Therefore, in the case of a VH having a VH identifier of "3", a VH with a VH number of "0", a VH with a VH number of "1", and a VH with a VH number of "2" do not necessarily exist.

In this and the other examples, the VH with the VH identifier of "0" (hereinafter, expressed as "VH (0)") will be used for management (VH (0) will be used for management in a data transfer as well, such as the transfer of setting information), and the VHs other than the VH (0) (VH (1), VH (2), VH (3), and the like) will be used for transferring data between the EPs. Below, in a case where simply "VH" is expressed in this and the other examples, this will specify the VH (a VH other than the VH (0)) that is used for transferring data between the EPs. Then, when specifying the VH (VH (0)) that is used for management, this will be clearly expressed as the "management VH". Similarly, when simply "function unit" is expressed, this will specify the function unit 212 that belongs to the VH (the VH used for data transfer). Then, when specifying the function unit (the base function unit) 212 that belongs to the management VH, this will be clearly expressed as the "management function unit". Each EP comprises one management function unit 212. The management function unit 212 manages a function conforming to the MR-IOV specification. Furthermore, it is supposed that the number of supported VH is the number of VH that are supported (VH used for data transfer), and that the supported number of management VH does not include the number of supported VH. Further, in this and the other examples, in a case where one RP 204 combines the root ports of a management VH and an inter-EP data transfer VH, this RP 204 is the MRA RP of the MR-IOV specification.

The EP1 comprises a management function unit 212 belonging to one management VH (VH (0)), and two function units 212 (F (1) on EP1, and F (3) on EP1) that respectively belong to two VHs (VH (1), VH (3)). That is, the EP1 supports one management VH (VH (0)), and two VHs (VH (1), VH (3)).

The BEIF 210 that corresponds to the EP2 is connected to the DA 211 via a channel D00. The BEIF 210 reciprocally converts the data transfer protocol used on the channel D00 and the data transfer protocol used on the internal network inside the controller 20. Furthermore, the EP2 and the SW11 may be collectively implemented as a single component 102. The EP2 comprises a function unit 212 (F (2) on EP2) (belonging to VH (2)) that is accessible from the RP2, and a function unit 212 (F (4) on EP2) (belonging to VH (4)) that is accessible from the RP4. That is, the EP2 supports one management VH (VH (0)) and two VHs (VH (2), VH (4)).

The CM1 is connected to the CMIF 208A corresponding to EP3. The CM1 temporarily stores data received from the EP1 and the EP2. The CM1 also stores the control information and so forth that is referenced inside the controller 20. Furthermore, the EP3 and the SW12 may be collectively implemented as a single component 103. The EP3 comprises a function unit 212 (F (1) on EP3) (belonging to VH (1)) that is accessible from the RP1, a function unit 212 (F (2) on EP3) (belonging to VH 2) that is accessible from the RP2, and a function unit (F (3) on EP3) (belonging to VH (3)) that is accessible from the RP3. That is, the EP3 supports one management VH (VH (0)) and three VHs (VH (1), VH (2), VH (3)).

The CM2 is connected to the CMIF 208B corresponding to EP4. The same as the CM1, the CM2 temporarily stores data received from the EP1 and the EP2. The CM2 also stores the control information and so forth that is referenced inside the controller 20. Furthermore, the EP4 and the SW13 may be collectively implemented as a single component 104. The EP4 comprises a function unit 212 (F (1) on EP4) (belonging to VH (1)) that is accessible from the RP1, a function unit 212 (F (3) on EP4) (belonging to VH (3)) that is accessible from the RP3, and a function unit 212 (F (4) on EP4) (belonging to VH (4)) that is accessible from the RP4. That is, the EP4, like EP3, supports one management VH (VH (0)) and three VHs (VH (1), VH (3), VH (4)).

Each EP is connected to the SVP 30 by way of the management network inside the controller 20. The SVP 30 is able to send setting information inputted by the Administrator to the respective EPs.

Furthermore, the FEIF 207 and the BEIF 210 may be implemented as a single EP. In accordance with this, the one EP will realize the functions of both the FEIF 207 and the BEIF 210.

A MR-PCIM (Multi-Root PCI Manager) is a computer program comprising functions for setting and managing the internal network (the network components, such as the switches 205 and the EPs) inside the controller 20. In this and the other examples, the MR-PCIM is stored in any memory 202 provided in the controller 20, and is executed by the processor 201 connected to this memory 202. The Administrator is able to use the MR-PCIM to set and manage the mapping of the RP 204 and the function units 212 included in the EPs (that is, the association relationship between the RP 204 and the function unit 212 (or the EP comprising this function unit 212) that this RP 204 is able to access. For example, the Administrator is able to set the above-mentioned mapping in accordance with the Administrator inputting via the SVP 30 the setting information to the MR-PCIM that operates on the processor 201 inside the controller 20, and the MR-PCIM, which received the input, sending the setting information to the switches 205 and EPs. Furthermore, the MR-PCIM may be loaded in the SVP 30. In a case where the MR-PCIM is loaded in the SVP 30, the MR-PCIM, which operates on the SVP 30, is able to set the above-mentioned mapping by receiving the input from the Administrator and sending the setting information to the switches 205 and the EPs directly from the SVP 30.

FIG. 2 is a diagram showing an example of a mapping table 400 pertaining to the storage system 10 related to the first example.

The mapping table 400 is a table denoting the association relationship between each RP 204 that the storage system 10 comprises and the EP that this RP 204 is able to access (the EP comprising the function unit 212 accessible by this RP 204). Furthermore, saying that the RP 204 is able to access the EP signifies that the processor 201 connected to the RC203 comprising this RP 204 is able to access this EP (is able to control the transfer of data on this EP). The mapping table 400 is stored in a location that the MR-PCIM is able to reference, for example, the memory 202.

The "x" in the drawing show that the RP 204 corresponding to this "x" is able to access the EP corresponding to the "x". For example, the RP1 is able to access the EP1, the EP3 and the EP4. In other words, the EP1, the EP3 and the EP4 comprise function units 212 that the RP1 is able to access. Further, the RP2 is able to access the EP3 and the EP2. In other words, the EP3 and the EP2 comprise function units 212 that the RP2 is able to access.

In the mapping table 400, the total number of "x's" for each EP (the total number of "x's" lined up vertically) is equivalent to the number of supported VHs of the EP. For example, the mapping table 400 shows that the EP3 supports three VHs (the VH (1), the RP 204 for which is RP1, the VH (2), the RP 204 for which is RP2, and the VH (3), the RP 204 for which is RP3).

In accordance with this mapping table 400, the CPU1 is able to control a data transfer between the FEIF and the CMIF (FE-CM) by way of the RP1 on the VH (1), and is able to control a data transfer between the CMIF and the BEIF (CM-BE) by way of the RP2 on the VH (2). Further, the CPU2 is able to control a data transfer between the FEIF and the CMIF (FE-CM) by way of the RP3 on the VH (3), and is able to control a data transfer between the CMIF and the BEIF (CM-BE) by way of the RP4 on the VH (4). Therefore, the CPU1 and the CPU2 are each able to independently control data transfers between the FEIF and the BEIF (FE-BE).

FIG. 3 is a diagram illustrating operations at the time of a data write in the storage system 10 related to the first example.

Furthermore, in this drawing, the components required for illustrating the operations at the time of a data write are described, but descriptions of the other components (RC203, switches 205, and the like) have been omitted.

The CPU1 is able to respectively access the EP1 (FEIF 207), the EP3 (CMIF 208A) and the EP4 (CMIF 208B) via the RP1 (refer to reference sign 301 in the drawing). This topology configured from the RP1, the EP1, the EP3 and the EP4 corresponds to the VH (1). The CPU1 transfers to the EP3 and the EP4 the storage system 10 write data that was received by the EP1. Alternately, the CPU2 is able to access the EP1, the EP3 and the EP4 via the RP3 (refer to reference sign 302 in the drawing). This topology configured from the RP3, the EP1, the EP3 and the EP4 corresponds to the VH (3). The CPU2, similarly to the CPU1, transfers to the EP3 and the EP4 the storage system 10 write data that was received by the EP1.

The EP3 stores the write data transferred from the EP1 in the CM1. Further, the EP4 stores the write data transferred from the EP1 in the CM2. As a result of this, the write data inputted to the storage system 10 undergoes a dual-write to a pair 303 comprising the CM1 and the CM2.

Further, the CPU1 is able to access the EP3 and the EP2 (BEIF 210) via the RP2 (refer to reference sign 304 in the drawing). This topology configured from the RP2, the EP2 and the EP3 corresponds to the VH (2). The CPU1 transfers to write data stored in the CM1 to the EP2. Alternately, the CPU2 is able to access the EP4 and the EP2 via the RP4 (refer to reference sign 305 in the drawing). This topology configured from the RP4, the EP2 and the EP4 corresponds to the VH (4). The CPU2 transfers the write data stored in the CM2 to the EP2.

The storage system 10 related to the first example respectively stores (dual writes) write data in two CMs 209 (CM1, CM2) in a FE-CM data transfer like this. Then, the storage system 10 transfers the write data from the one dual-write CM 209 to the BEIF 210 in a CM-BE data transfer.

Figure 4:
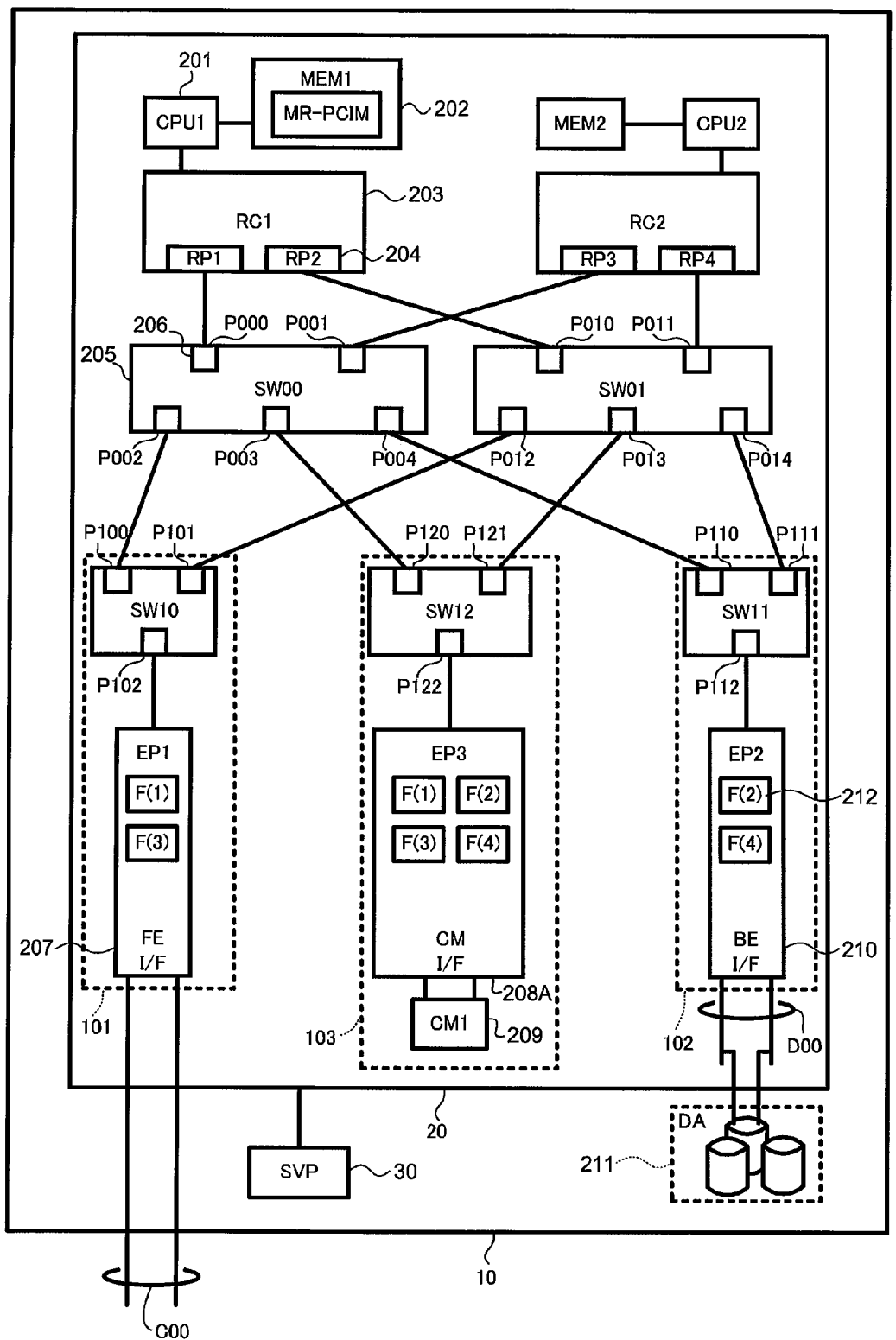
FIG. 4 is a diagram showing an example of the configuration of the storage system in a case where the dual writing of write data to the CM is not carried out.

FIG. 4 is a diagram showing an example of the configuration of the storage system 10 in a case where the dual writing of the write data to the CM 209 is not carried out.

The main difference with the configuration of the storage system (the storage system of FIG. 1) 10 related to this example is that the SW13, the EP4 and the CM2 are not included in the storage system 10 of FIG. 4. In FIG. 4, four function units 212 belonging to the VHs are comprised in the EP3 corresponding to the CMIF 208A. Specifically, the EP3 comprises a function unit 212 (F (1) on EP3) (belonging to VH (1)) that is accessible from the RP1, a function unit 212 (F (2) on EP3) (belonging to VH (2)) that is accessible from the RP2, a function unit 212 (F (3) on EP3) (belonging to VH (3)) that is accessible from the RP3, and a function unit 212 (F (4) on EP3) (belonging to VH (4)) that is accessible from the RP4. That is, the EP3 supports one management VH (VH (0)) and four VHs (VH (1), VH (2), VH (3), VH (4)).

Figure 5:
FIG. 5 is a diagram showing an example of the mapping table pertaining to the storage system of FIG. 4.

FIG. 5 is a diagram showing an example of the mapping table 400 relating to the storage system 10 of FIG. 4.

The mapping table 400 of FIG. 5, unlike that of FIG. 2, shows that the EP3 supports four VHs (the VH (1), the RP 204 for which is RP1, the VH (2), the RP 204 for which is RP2, the VH (3), the RP 204 for which is RP3, and the VH (4), the RP 204 for which is RP4).

The storage system 10 related to this example and the storage system 10 of FIG. 4 are the same in that in both the two processors 201 control a FE-BE data transfer by way of a total of four RP 204. However, the difference is that the number of function units 212 (that is, the number of supported VHs) to be included in each EP (EP3, EP4) corresponding to the CMIF 208 is "3" in the case of FIG. 1 and is "4" in the case of FIG. 4.

The storage system 10 generally carries out a FE-BE data transfer via the CM 209. For this reason as in the case of the storage system 10 of FIG. 4, in the MR-IOV, in order to make it possible for all of the processors 201 inside the storage system 10 to control a data transfer, normally the CMIF 208 (EP3) that is in charge of the input/output of the CM 209 must support all the VHs (in this example, VH (1) through VH (4)) via which the respective processors 201 control the data transfer. For this reason, normally it becomes necessary for the CMIF 208 (EP3) to comprise four function units 212 (that is, the number of supported VHs is "4") so as to be accessible from all (four in this example) of the RP 204. In accordance with this, the CMIF 208 (EP3) must comprise four function resources.

Alternately, the storage system 10 related to this example reduces the number of supported VHs in each of the CMIF 208 (EP3 and EP4) to "3" by adopting a configuration like that described above (a configuration in which the write data undergoes dual writing to the CM 209 in the FE-CM data transfer, and the write data is transfer to the BE from the one dual-write CM 209 in the CM-BE data transfer). Therefore, in this example, the respective CMIF 208 (EP3 and EP4) may comprise three function resources. From a different perspective, in a case where the CMIF 208 comprises four function resources, since the one extra function resource is able to be used to support another VH, access from another new RP 204 becomes possible, and control in accordance with another new processor 201 becomes possible. That is, control in accordance with a larger number of processors 201 becomes possible. Furthermore, the EP does not generally comprise that many function resources due to restrictions resulting from the size of the semiconductor integrated circuit. For this reason, in order to make control by a larger number of processors 201 possible, it is important to reduce the size of the function resource required per EP. In the storage system 10 related to this example, a maximum of 4/3 times the RP 204 are able to access the CMIF 208 compared to the storage system 10 of FIG. 4.

It is supposed that the number of supported VHs of the EP that corresponds to the CMIF 208 is N (3 in this example). Further, it is supposed that the number of RP 204 that exist on the internal network inside the controller 20 is M (4 in this example). In accordance with this, the storage system 10 related to this example realizes RP 204 connections of a number larger than N, for example, 4N/3 RP 204 with respect to the internal network of the controller 20 by carrying out a data transfer between the one of the duplexed CM 209 and the BEIF over (M−N) VHs, and carrying out a data transfer between the other of the duplexed CM 209 and the BEIF over different (M−N) VHs.

In addition, since write data undergoes dual writing to two CMs 209 in a FE-CM data transfer over (2N−M) VHs, the storage system of the embodiment of the present invention is characterized by being able to achieve both EP resource savings and high reliability with respect to data integrity.

Example 2

Figure 6:
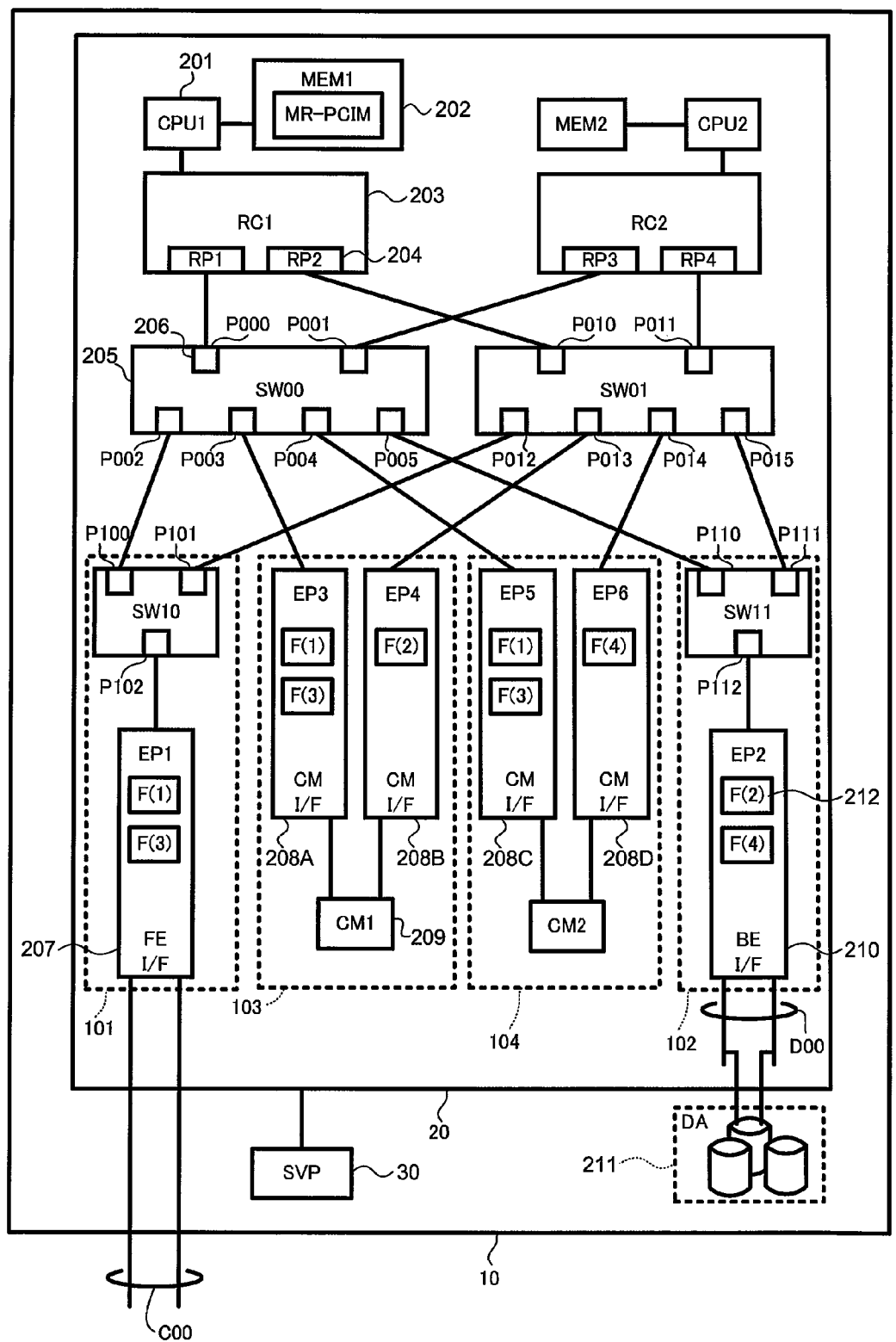
FIG. 6 is a diagram showing an example of the configuration of a storage system related to a second example.

FIG. 6 is a diagram showing an example of the configuration of a storage system 10 related to a second example.

The storage system 10 related to the second example is characterized in that the CM1 and the CM2 are each connected to the switches 205 via two EPs (either EP3 and EP4 or EP5 and EP6).

The CM1 is connected to the EP3 corresponding to the CMIF 208A. Further, the CM1 is also connected to the EP4 corresponding to the CMIF 208B. The CM1, the EP3 and the EP4 may be collectively implemented as a single component 103. The EP3 comprises a function unit 212 (F (1) on EP3) (belonging to VH (1)) that is accessible from the RP1, and a function unit 212 (F (3) on EP3) (belonging to VH (3)) that is accessible from the RP3. Alternately, the EP4 comprises a function unit 212 (F (2) on EP4) (belonging to VH (2)) that is accessible from the RP2. That is, the EP3 and EP4, which are connected to the CM1, support a total of three VHs (VH (1), VH (2), VH (3)).

The CM2 is connected to the EP5 corresponding to the CMIF 208C. Further, the CM2 is also connected to the EP6 corresponding to the CMIF 208D. The CM2, the EP5 and the EP6 may be collectively implemented as a single component 104. The EP5 comprises a function unit 212 (F (1) on EP5) (belonging to VH (1)) that is accessible from the RP1, and a function unit 212 (F (3) on EP5) (belonging to VH (3)) that is accessible from the RP3. Alternately, the EP6 comprises a function unit 212 (F (4) on EP6) (belonging to VH (4)) that is accessible from the RP4. That is, the EP5 and EP6, which are connected to the CM2, support a total of three VHs (VH (1), VH (3), VH (4)).

The EP1 corresponding to the FEIF 207 and the EP2 corresponding to the BEIF 210 are configured the same as in the first example.

FIG. 7 is a diagram showing an example of the mapping table 400 pertaining to the storage system 10 related to the second example.

As shown in FIG. 7, the RP1 and the RP3 are both able to access the EP3 and the EP5. Further, the RP2 is able to access the EP4, and the RP4 is able to access the EP6. That is, the number of supported VHs for both the EP3 and the EP5 is "2", and the number of supported VHs for both the EP4 and the EP6 is "1". The total value of the number of supported VHs for the CMIF 208A and 208B (that is, the EP3 and the EP4), which are connected to the CM1, is "3", and the total value of the number of supported VHs for the CMIF 208C and 208D (that is, the EP5 and the EP6), which are connected to the CM2, is "3".

The same as the first example, in accordance with this mapping table 400, the CPU1 is able to control a data transfer between the FEIF and the CMIF (FE-CM) by way of the RP1 on the VH (1), and is able to control a data transfer between the CMIF and the BEIF (CM-BE) by way of the RP2 on the VH (2). Further, the CPU2 is able to control a data transfer between the FEIF and the CMIF (FE-CM) by way of the RP3 on the VH (3), and is able to control a data transfer between the CMIF and the BEIF (CM-BE) by way of the RP4 on the VH (4). Therefore, the CPU1 and the CPU2 are each able to independently control data transfers between the FEIF and the BEIF (FE-BE).

The storage system 10 related to this example reduces the number of supported VHs of the respective CMIFs 208 (EP3, EP4, EP5 and EP6) to either "1" or "2" by adopting the above-described configuration (the configuration in which the CM1 and the CM2 are connected to the switches 205 via two endpoints each (either the EP3 and the EP4, or the EP5 and the EP6). Therefore, this example is able to reduce the size of the function resources per CMIF 208 further than the first example, as a result, making possible control in accordance with more processors 201.

It is supposed that the total value of the number of supported VHs of the respective EPs that are connected to the respective CM 209 is N (3 in this example). Further, it is supposed that the number of RP 204 that exist on the internal network of the controller 20 is M (4 in this example). In accordance with this, the storage system 10 related to this example realizes RP 204 connections of a number larger than N with respect to the internal network of the controller 20 by carrying out a data transfer between the one of the duplexed CM 209 and the BEIF over (M–N) VHs, and carrying out a data transfer between the other of the duplexed CM 209 and the BEIF over different (M–N) VHs.

Example 3

Figure 8:
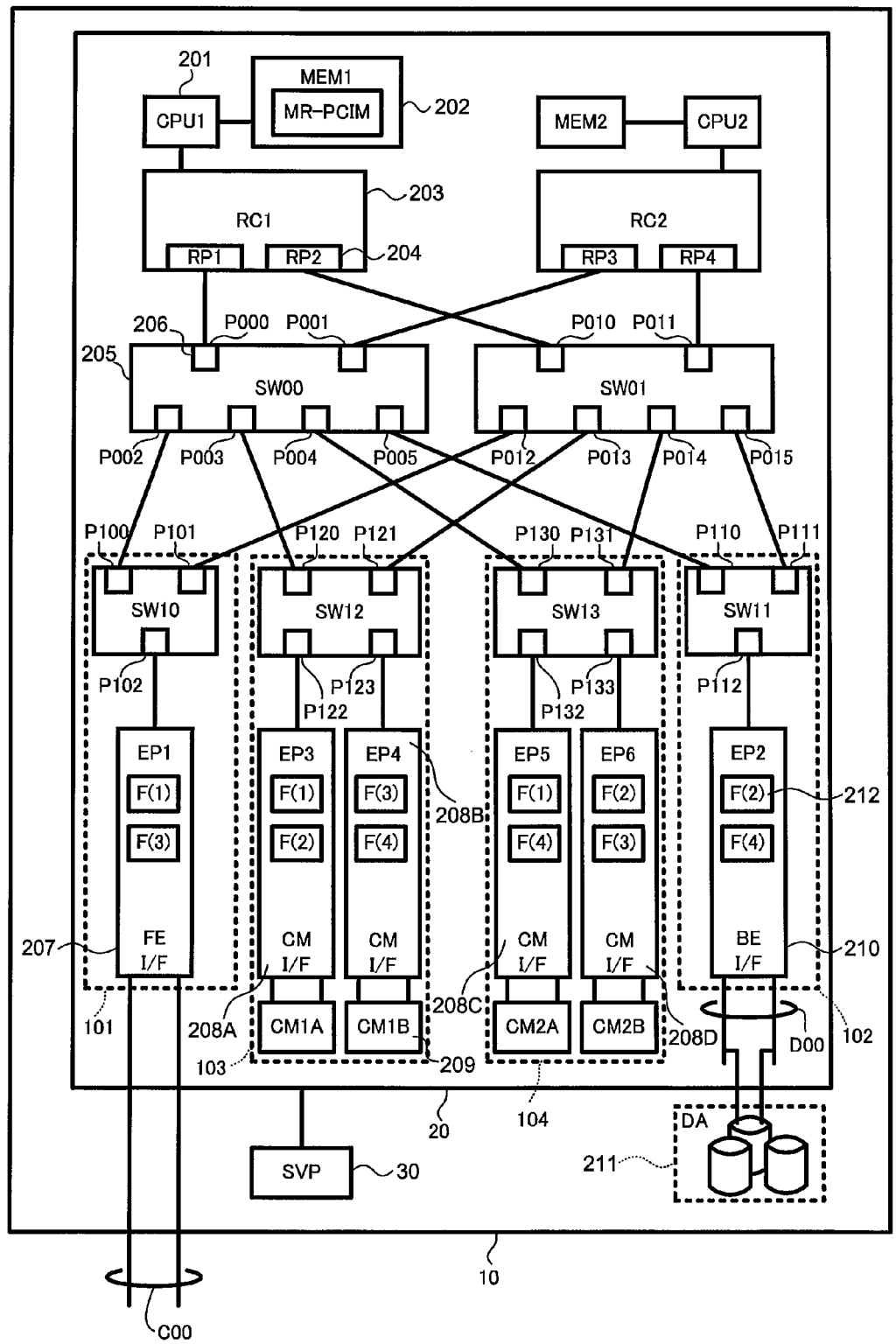
FIG. 8 is a diagram showing an example of the configuration of a storage system related to a third example.

FIG. 8 is a diagram showing an example of the configuration of a storage system 10 related to a third example.

The storage system 10 related to the third example is characterized in that the CM1 and the CM2 in either the first example or the second example are each dual partitioned. Specifically, the CM1 is partitioned into a CM1A and a CM1B, and the CM2 is partitioned into a CM2A and a CM2B. Each CM 209 is connected to the switch 205 via a single CMIF 208.

The CM1A is connected to the EP3 that corresponds to the CMIF 208A. Further, the CM1B is connected to the EP4 that corresponds to the CMIF 208B. Further, the CM2A is connected to the EP5 that corresponds to the CMIF 208C. Further, the CM2B is connected to the EP6 that corresponds to the CMIF 208D. The CM1A, the CM1B, the EP3 and the EP4 may be collectively implemented as a single component 103. The CM2A, the CM2B, the EP5 and the EP6 may be collectively implemented as a single component 104.

The EP3 comprises a function unit 212 (F (1) on EP3) (belonging to VH (1)) that is accessible from the RP1, and a function unit 212 (F (2) on EP3) (belonging to VH (2)) that is accessible from the RP2. The EP4 comprises a function unit 212 (F (3) on EP4) (belonging to VH (3)) that is accessible from the RP3, and a function unit 212 (F (4) on EP4) (belonging to VH (4)) that is accessible from the RP4. The EP5 comprises a function unit 212 (F (1) on EP5) (belonging to VH (1)) that is accessible from the RP1, and a function unit 212 (F (4) on EP5) (belonging to VH (4)) that is accessible from the RP4. The EP6 comprises a function unit 212 (F (2) on EP6) (belonging to VH (2)) that is accessible from the RP2, and a function unit 212 (F (3) on EP6) (belonging to VH (3)) that is accessible from the RP3. Each CMIF 208 (EP3 through EP6) respectively supports one management VH and two VHs.

The configurations of the EP1 corresponding to the FEIF 207 and the EP2 corresponding to the BEIF 210 are the same as in the first example.

FIG. 9 is a diagram showing an example of the mapping table 400 pertaining to the storage system 10 related to the third example.

As shown in FIG. 9, two RP 204 are able to access any of the EP3 through the EP6. That is, the number of supported VHs of the EP3 through the EP6 is "2" each.

The same as the first example, in accordance with this mapping table 400, the CPU1 is able to control a data transfer between the FEIF and the CMIF (FE-CM) by way of the RP1 on the VH (1), and is able to control a data transfer between the CMIF and the BEIF (CM-BE) by way of the RP2 on the VH (2). Further, the CPU2 is able to control a data transfer between the FEIF and the CMIF (FE-CM) by way of the RP3 on the VH (3), and is able to control a data transfer between the CMIF and the BEIF (CM-BE) by way of the RP4 on the VH (4). Therefore, the CPU1 and the CPU2 are each able to independently control data transfers between the FEIF and the BEIF (FE-BE).

FIG. 10 is a diagram illustrating the operations at the time of a data write in the storage system 10 related to the third example.

The same as FIG. 3, the components required for illustrating the operations at the time of a data write are described in FIG. 10, but descriptions of the other components (RC203, switches 205, and the like) have been omitted.

The CPU1 is able to respectively access the EP1 (FEIF 207), the EP3 (CMIF 208A) and the EP5 (CMIF 208C) via the RP1 (refer to reference sign 1001 in the drawing). This topology configured from the RP1, the EP1, the EP3 and the EP5 corresponds to the VH (1). The CPU1 transfers to the EP3 and the EP5 the storage system 10 write data that was received by the EP1. Alternately, the CPU2 is able to access the EP1, the EP4 (CMIF 208B) and the EP6 (CMIF 208D) via the RP3 (refer to reference sign 1002 in the drawing). This topology configured from the RP3, the EP1, the EP4 and the EP6 corresponds to the VH (3). The CPU2 transfers to the EP4 and the EP6 the storage system 10 write data that was received by the EP1.

The EP3 stores the write data transferred from the EP1 in the CM1A, and the EP4 stores the write data transferred from the EP1 in the CM1B. Further, the EP5 stores the write data transferred from the EP1 in the CM2A, and the EP6 stores the write data transferred from the EP1 in the CM2B. As a result of this, the write data inputted to the storage system 10 undergoes dual-writes to a pair (hereinafter, "CM pair") 1003 comprising the CM1A and the CM1B, and to a CM pair 1004 comprising the CM2A and the CM2B.

The CPU1 is able to access the EP3, the EP6 and the EP2 (BEIF 210) via the RP2 (refer to reference sign 1005 in the drawing). This topology configured from the RP2, the EP2, the EP3 and the EP6 corresponds to the VH (2). The CPU1 transfers to the EP2 the write data that was stored in either the CM1A or the CM2B. Alternately, the CPU2 is able to access the EP4, the EP5 and the EP2 via the RP4 (refer to reference sign 1006 in the drawing). This topology configured from the RP4, the EP2, the EP4 and the EP5 corresponds to the VH (4). The CPU2 transfers to the EP2 the write data that was stored in either the CM1B or the CM2A.

The storage system 10 related to the third example respectively stores (dual writes) the write data in the two CM pairs 1003, 1004 in a FE-CM data transfer like this. Then, the storage system 10 transfers the write data from the one of the dual-write CM pairs 1003, 1004 to the BEIF 210 in a CM-BE data transfer.

It is supposed that the number of supported VHs of the EP that corresponds to the CMIF 208 is N (2 in this example). Further, it is supposed that the number of RP 204 that exist on the internal network of the controller 20 is M (4 in this example). In accordance with this, the storage system 10 related to this example realizes RP 204 connections of a number larger than N, for example, 2N RP 204 with respect to the internal network of the controller 20 by carrying out a data transfer between the one of the CM pairs, in which the write data had been duplicated, and the BEIF over (M−N) VHs.

FIG. 11 is a diagram showing another example of the mapping table 400 pertaining to the storage system 10 related to the third example.

The points of difference with FIG. 9 are that the EP accessible by the RP2 is EP4 instead of EP6, and the EP accessible by the RP4 is EP6 instead of EP4.

Example 4

Figure 12:
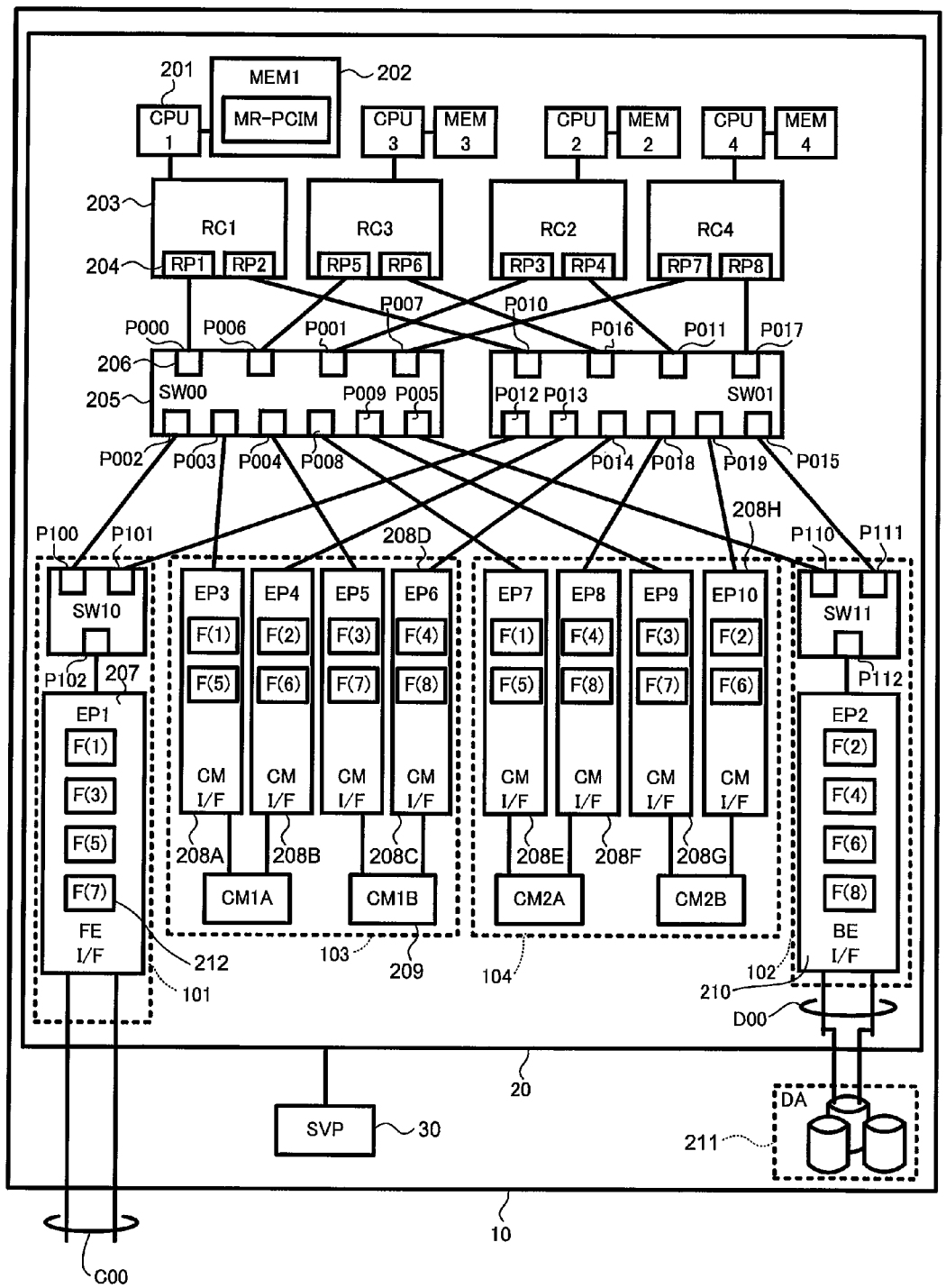
FIG. 12 is a diagram showing an example of the configuration of a storage system related to a fourth example.

FIG. 12 is a diagram showing an example of the configuration of a storage system 10 related to a fourth example.

The storage system 10 related to the fourth example comprises four RC 203 (RC1 through RC4). One processor 201 (CPU1 through CPU4) is connected to each RC 203 (RC1 through RC4). Further, each RC 203 (RC1 through RC4) comprises two RP 204. Therefore, a total of eight RP 204 exist in the storage system 10 related to the fourth example.

The storage system 10 related to the fourth example is a combination of the storage systems 10 of the second example and the third example. That is, the storage system 10 comprises the CM1A and the CM1B achieved by dual-partitioning the CM1, and the CM2A and the CM2B achieved by dual-partitioning the CM2. Further, each CM 209 (CM1A, CM1B, CM2A, CM2B) is connected to the switches 205 via two EPs. The same as third example, the write data inputted to the storage system 10 undergoes dual-writes to a CM pair comprising the CM1A and the CM1B, and to a CM pair comprising the CM2A and the CM2B.

The EP1 corresponding to the FEIF 207 comprises a function unit 212 (F (1) on EP1) (belonging to VH (1)) that is accessible from the RP1, a function unit 212 (F (3) on EP1) (belonging to VH (3)) that is accessible from the RP3, a function unit 212 (F (5) on EP1) (belonging to VH (5)) that is accessible from the RP5, and a function unit 212 (F (7) on EP1) (belonging to VH (7)) that is accessible from the RP7.

The EP2 corresponding to the BEIF 210 comprises a function unit 212 (F (2) on EP2) (belonging to VH (2)) that is accessible from the RP2, a function unit 212 (F (4) on EP2) (belonging to VH (4)) that is accessible from the RP4, a function unit 212 (F (6) on EP2) (belonging to VH (6)) that is accessible from the RP6, and a function unit 212 (F (8) on EP2) (belonging to VH (8)) that is accessible from the RP8.

The CM1A is connected to the EP3 corresponding to the CMIF 208A. Further, the CM1A is also connected to the EP4 corresponding to the CMIF 208B. The EP3 comprises a function unit 212 (F (1) on EP3) (belonging to VH (1)) that is accessible from the RP1, and a function unit 212 (F (5) on EP3) (belonging to VH (5)) that is accessible from the RP5. The EP4 comprises a function unit 212 (F (2) on EP4) (belonging to VH (2)) that is accessible from the RP2, and a function unit 212 (F (6) on EP4) (belonging to VH (6)) that is accessible from the RP6. That is, the EP3 and the EP4, which are connected to the CM1A, support a total of four VHs (VH (1), VH (2), VH (5), VH (6)).

The CM1B is connected to the EP5 corresponding to the CMIF 208C. Further, the CM1B is also connected to the EP6 corresponding to the CMIF 208D. The EP5 comprises a function unit 212 (F (3) on EP5) (belonging to VH (3)) that is accessible from the RP3, and a function unit 212 (F (7) on EP5) (belonging to VH (7)) that is accessible from the RP7. The EP6 comprises a function unit 212 (F (4) on EP6) (belonging to VH (4)) that is accessible from the RP4, and a function unit 212 (F (8) on EP6) (belonging to VH (8)) that is accessible from the RP8. That is, the EP5 and the EP6, which are connected to the CM1B, support a total of four VHs (VH (3), VH (4), VH (7), VH (8)).

The CM2A is connected to the EP7 corresponding to the CMIF 208E. Further, the CM2A is also connected to the EP8 corresponding to the CMIF 208F. The EP7 comprises a function unit 212 (F (1) on EP7) (belonging to VH (1)) that is accessible from the RP1, and a function unit 212 (F (5) on EP7) (belonging to VH (5)) that is accessible from the RP5. The EP8 comprises a function unit 212 (F (4) on EP8) (belonging to VH (4)) that is accessible from the RP4, and a function unit 212 (F (8) on EP8) (belonging to VH (8)) that is accessible from the RP8. That is, the EP7 and the EP8, which are connected to the CM2A, support a total of four VHs (VH (1), VH (4), VH (5), VH (8)).

The CM2B is connected to the EP9 corresponding to the CMIF 208G. Further, the CM2B is also connected to the EP10 corresponding to the CMIF 208H. The EP9 comprises a function unit 212 (F (3) on EP9) (belonging to VH (3)) that is accessible from the RP3, and a function unit 212 (F (7) on EP9) (belonging to VH (7)) that is accessible from the RP7. The EP10 comprises a function unit 212 (F (2) on EP10) (belonging to VH (2)) that is accessible from the RP2, and a function unit 212 (F (6) on EP10) (belonging to VH (6)) that is accessible from the RP6. That is, the EP9 and the EP10, which are connected to the CM2B, support a total of four VHs (VH (2), VH (3), VH (6), VH (7)).

Furthermore, the CM1A, the CM1B, and the EP3 through the EP6 may be collectively implemented in a single component 103. The CM2A, the CM2B, and the EP7 through the EP10 may also be collectively implemented in a single component 104.

FIG. 13 is a diagram showing an example of the mapping table 400 pertaining to the storage system 10 related to the fourth example.

As shown in FIG. 13, two RP 204 are able to access any of the EP3 through the EP10. That is, the number of supported VHs of the EP3 through the EP10 is "2" each.

In accordance with this mapping table 400, the CPU1 is able to control a data transfer between the FEIF and the CMIF (FE-CM) by way of the RP1 on the VH (1), and is able to control a data transfer between the CMIF and the BEIF (CM-BE) by way of the RP2 on the VH (2). Further, the CPU2 is able to control a data transfer between the FEIF and the CMIF (FE-CM) by way of the RP3 on the VH (3), and is able to control a data transfer between the CMIF and the BEIF (CM-BE) by way of the RP4 on the VH (4). Further, the CPU3 is able to control a data transfer between the FEIF and the CMIF (FE-CM) by way of the RP5 on the VH (5), and is able to control a data transfer between the CMIF and the BEIF (CM-BE) by way of the RP6 on the VH (6). Further, the CPU4 is able to control a data transfer between the FEIF and the CMIF (FE-CM) by way of the RP7 on the VH (7), and is able to control a data transfer between the CMIF and the BEIF (CM-BE) by way of the RP8 on the VH (8). Therefore, the CPU1 through the CPU4 are each able to independently control data transfers between the FEIF and the BEIF (FE-BE).

Compared to the third example, in the storage system 10 related to the fourth example, the number of supported VHs of the CMIF 208 is "2" the same as the third example, in which two processors 201 control data transfers, despite the fact that four processors 201 are able to control the data transfers in the fourth example. That is, the storage system 10 related to this example reduces the size of the function resources per CMIF 208 by adopting the above-described configuration (the configuration in which the CM1 and the CM2 are dual-partitioned, and each CM 209 is connected to the switches 205 via two EPs), thereby making possible control in accordance with a larger number (4) of processors 201 than in the first example through the third example.

It is supposed that the total value of the number of supported VHs of the respective EP that are connected to the respective CM 209 is N (4 in this example). Further, it is supposed that the number of RP 204 that exist on the internal network of the controller 20 is M (8 in this example). In accordance with this, the storage system 10 related to this example realizes RP connections of a number (2N=8) that is larger than N (4) with respect to the internal network of the controller 20 by carrying out a data transfer between the one of the duplexed CM pairs and the BEIF over (M−N) VHs.

Example 5

Examples 5 through 8 relate to a method for augmenting processors 201 in a storage system 10 that uses the MR-IOV. A processor 201 augmentation method related to a fifth example will be explained below by referring to FIGS. 14 through 23.

Figure 14:
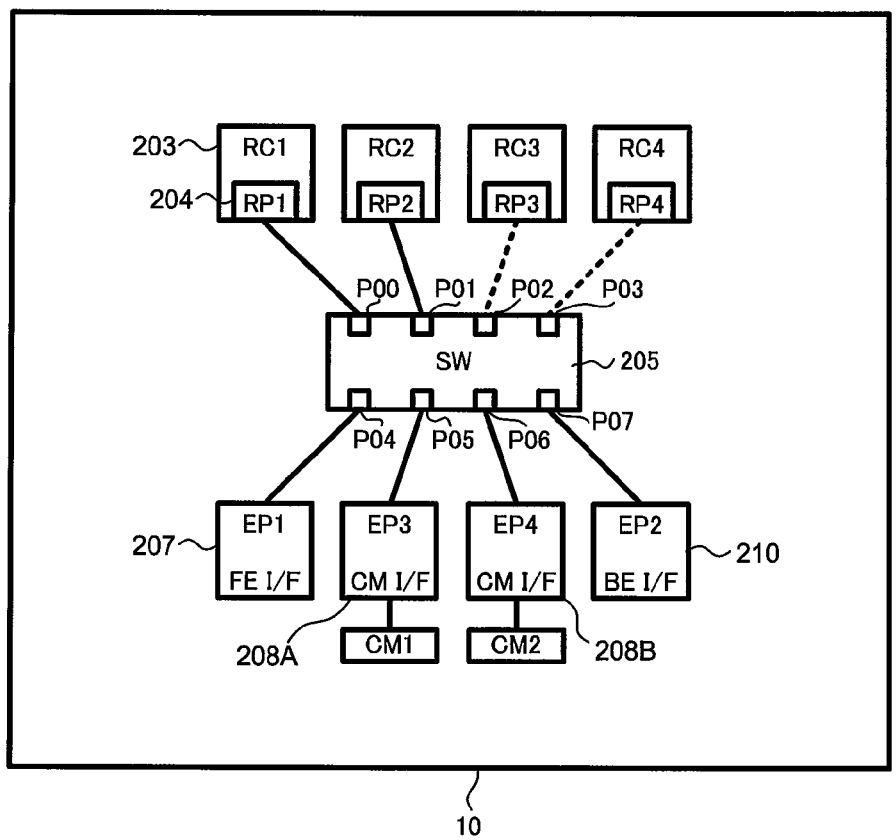
FIG. 14 is a diagram showing the topology of the internal network of the storage system in an augmentation method related to a fifth example.

FIG. 14 is a diagram showing the topology of the internal network of the storage system 10 in the augmentation method related to the fifth example.

A port P00 of switch 205 is connected to the RP1 disposed in the RC1. A port P01 is connected to the RP2 disposed in the RC2. A port P02 is connected to the RP3 disposed in the RC3. A port P03 is connected to the RP4 disposed in the RC4. A port P04 is connected to the EP1 corresponding to the FEIF 207. A port P05 is connected to the EP3 corresponding to the CMIF 208A connected to the CM1. A port P06 is connected to the EP4 corresponding to the CMIF 208B connected to the CM2. A port P07 is connected to the EP2 corresponding to the BEIF 210.

Furthermore, although not shown in the drawing, the CPU1 is connected to the RC1, the CPU2 is connected to the RC2, the CPU3 is connected to the RC3, and the CPU4 is connected to the RC4, respectively. Therefore, the CPU1 controls a data transfer via the RP1 on the VH (1), the CPU2 controls a data transfer via the RP2 on the VH (2), the CPU3 controls a data transfer via the RP3 on the VH (3), and the CPU4 controls a data transfer via the RP4 on the VH (4), respectively.

In this example, it is supposed that two RP 204 (RP1 and RP2) are connected to a switch 205 in the initial state. Then, two RP 204 (RP3 and RP4) are newly connected in accordance with an augmentation method, which will be explained below. That is, in the initial state, the CPU1 and the CPU2 are mounted, and, in accordance with the augmentation method explained below, the CPU3 and the CPU4 are added.

Figure 15:
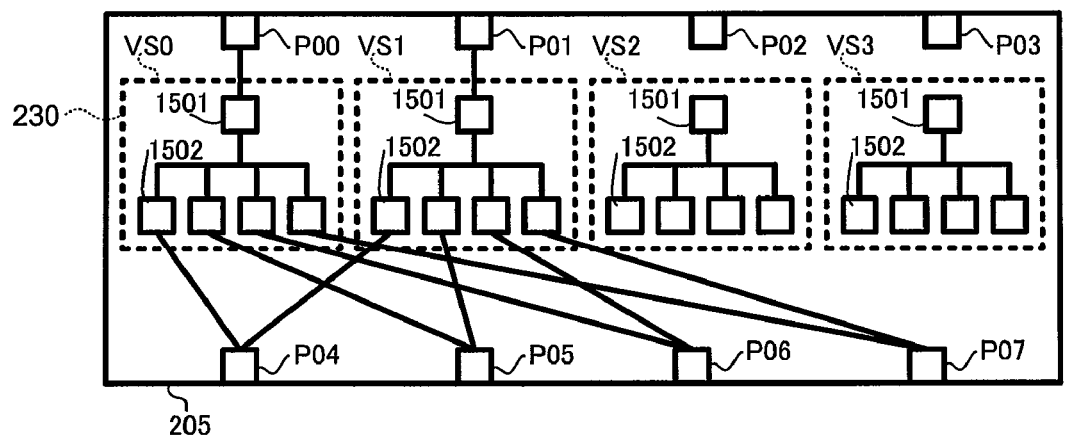
FIG. 15 is a diagram showing the internal configuration of an initialized switch in the augmentation method related to the fifth example.
Figure 16:
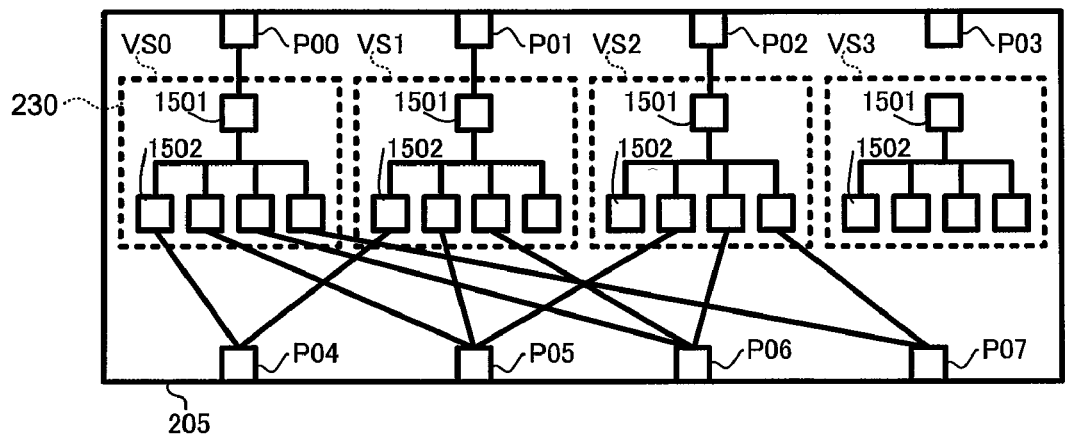
FIG. 16 is a diagram showing the internal configuration of a switch in a case where a CPU3 has been added in the augmentation method related to the fifth example.

FIGS. 15 through 17 are diagrams showing the internal configuration of the switch 205 related to this example.

The switch 205 is a MRA switch associated with the MR-IOV, and comprises a plurality of virtual switches 230 on the inside. Since the switch 205 related to this example connects to a maximum of four RP 204 (RP1 through RP4), the switch 205 comprises four virtual switches 230 (VS0 through VS3). Each virtual switch 230 comprises one upstream bridge 1501, and more downstream bridges 1502 than the number of EPs connected to the switch 205. The upstream bridge 1501 is associated with any of the ports (hereinafter, "upstream port") P00 through P03 for connecting to the RP 204. The downstream bridge 1502 is associated with the ports (hereinafter, "downstream port") P04 through P07 for connecting to the EPs.

Furthermore, in this example, it is supposed that the maximum value of the number of supported VHs of the EP1 and the EP2 (that is, the maximum number of function units 212 that the EP1 and the EP2 are able to comprise, hereinafter called the "maximum number of supported VHs") is "2". Further, it is supposed that the maximum number of supported VHs for the EP3 and the EP4 is "3".

FIG. 15 shows the internal configuration of the switch 205 in the initial state.

In the initial state, two virtual switches 230 (VS0 and VS1), which correspond to the upstream ports P00, P01 connected to the RP1 and the RP2, are enabled. That is, the upstream bridge 1501 of the VS0 is associated with the upstream port P00 connected to the RP1. Also, the upstream bridge 1501 of the VS1 is associated with the upstream port P01 connected to the RP2. Further, the respective downstream bridges 1502 of the VS0 and the VS1 are associated with the downstream ports P04 through P07.

FIG. 18 is a diagram showing the mapping table 400 in the initial state.

In the initial state, since the maximum number of supported VHs of each EP ("2") for the EP1 and the EP2, and "3" for the EP3 and the EP4) is equal to or more than the number ("2") of connected RP 204, as shown in FIG. 18, the RP1 and the RP2 are able to access all the EPs.

In accordance with this mapping table 400, the CPU1 is able to control both a data transfer from the FEIF 207 to the CM 209 and a data transfer from the CM 209 to the BEIF 210 by way of the RP1 on the VH (1). Further, the CPU2 is able to control both a data transfer from the FEIF 207 to the CM 209 and a data transfer from the CM 209 to the BEIF 210 by way of the RP2 on the VH (2). Therefore, the CPU1 and the CPU2 are each able to independently control data transfers between the FEIF 207 and the BEIF 210. In addition, since each processor 201 is able to control both a FE-CM data transfer and a CM-BE data transfer via a single RP 204, the storage system 10 is able to execute multiple data transfers between EPs, thereby making it possible to enhance the efficiency of data transfers when there is a small number of processors 201.

FIG. 16 shows the internal configuration of the switch 205 in a case where a CPU3 has been added.

In a case where the CPU3 has been added, that is, in a case where the RP3 is connected to the switch 205, a virtual switch 230 (VS2), which corresponds to an upstream port P02 connected to the RP3, is enabled. That is, the upstream bridge 1501 of the VS2 is associated with the upstream port P02 connected to the RP3. Further, the downstream bridge 1502 of the VS2 is associated with the downstream ports P05 through P07. Furthermore, the association between the downstream bridge 1502 of the virtual switch VS1 and the downstream port P07 is released.

FIG. 19 is a diagram showing the mapping table 400 in a case where the CPU3 has been added.

Since the maximum number of supported VHs for the EP3 and the EP4 is "3", and this maximum number is equal to or greater than the number ("3") of connected RP 204, all of the RP1, the RP2, and the RP3 are able to access the EP3 and the EP4. Furthermore, in order to enable the newly connected RP3 to access the EP3 and the EP4, a process, (hereinafter, "hot add process") which dynamically enables (or creates) a function unit 212 belonging to the VH (3) in each of the EP3 and EP4, is carried out.

Conversely, since the maximum number of supported VHs for the EP1 and the EP2 is "2", and this maximum number is smaller than the number ("3") of connected RP 204, not all of the RP1, the RP2, and the RP3 are able to access the EP1 and the EP2. For this reason, the mapping of either the EP1 or the EP 2 (the association relationship between the EP and the RP 204 that is able to access this EP) must be changed to enable the added CPU3 to control a data transfer by way of the RP3.

In this example, the mapping of the EP (EP1) corresponding to the FEIF 207 is maintained, and the mapping of the EP (EP2) corresponding to the BEIF 210 is changed. Specifically, as shown in FIG. 19, the state in which the RP1 and the RP2 are both able to access the EP1 is maintained as-is, but the mapping that enables the RP1 and the RP3 to access the EP 2 is changed. That is, the EP2-supported VHs change from VH (1) and VH (2) to VH (1) and VH (3) (refer to reference sign 1801 in the drawing). Furthermore, because the EP2 will be prevented from supporting the VH (2) at the time of this change, a process (hereinafter "hot remove process"), which dynamically disables (or deletes) the function unit 212 belonging to the VH (2) in the EP2, is carried out. In addition, the hot add process for supporting the VH (3) in the EP2 is carried out.

Furthermore, while the above-mentioned either hot add process or hot remove process is being carried out, it normally becomes difficult (or impossible) to control a data transfer pertaining to the EP that is targeted for this processing on the VH that is targeted for this processing. However, in this example, since the RP1 is able to access all of the EPs, the CPU1 is able to control both the transfer of data from the FEIF 207 to the CM 209 and the transfer of data from the CM 209 to the BEIF 210 (refer to reference sign 1802 in the drawing) by way of the RP1 on the VH (1). Therefore, even in a state where a hot add process and a hot remove process are carried out when adding the CPU3, and it becomes difficult (or impossible) to control the data transfer related to the EP2 on the VH (2) and VH (3), the storage system 10 is able to continue the FE-BE data transfer in accordance with the control of the CPU1. That is, in accordance with the augmentation method related to this example, it is possible to add the CPU3 while operating the storage system 10 as-is (maintaining as-is the state in which a request is received from the higher-level device).

FIG. 17 shows the internal configuration of the switch 205 in a case where a CPU4 is added in addition to the CPU3.

In a case where the CPU4 is added, that is, in a case where the RP4 is connected to the switch 205, a virtual switch 230 (VS3), which corresponds to an upstream port P03 connected to the RP4, is enabled. That is, the upstream bridge 1501 of the VS3 is associated with the upstream port P03 connected to the RP4. Further, the downstream bridge 1502 of the VS3 is associated with the downstream ports P06 and P07. Furthermore, the association between the downstream bridge 1502 of the virtual switch VS0 and the downstream port P07 is released. The association between the downstream bridge 1502 of the virtual switch VS2 and the downstream port P06 is also released.

Figure 20:
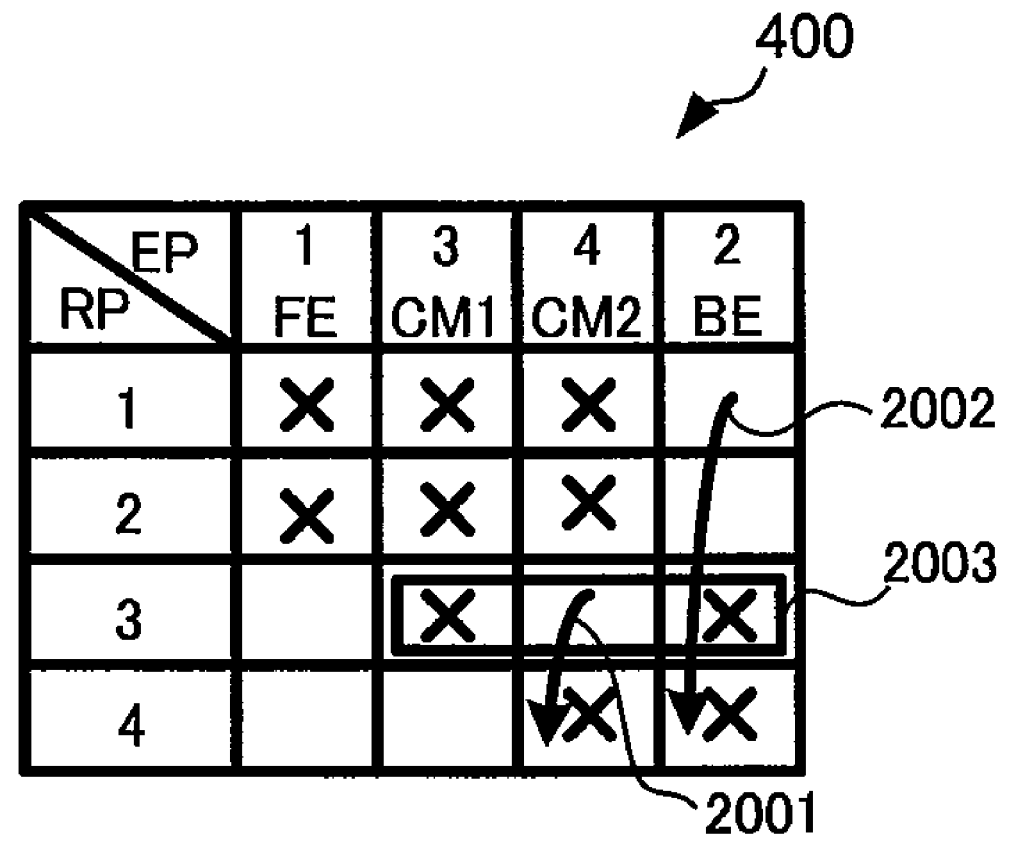

FIG. 20 is a diagram showing the mapping table 400 in the case where the CPU4 is added in addition to the CPU3.

Since the maximum number (either "2" or "3") of supported VHs for the respective EPs is smaller than the number ("4") of connected RP 204, it is not possible to enable all of the RP1, the RP2, the RP3, and the RP4 to access these EPs. Accordingly, the mapping is changed as described below.

That is, the state in which the RP1, the RP2 and the RP3 are respectively able to access the EP3 is maintained as-is, but the mapping that enables the RP1, the RP2, and the RP4 to access the EP4 is changed. That is, the EP4-supported VHs change from VH (1), VH (2) and VH (3) to VH (1), VH (2) and VH (4) (refer to reference sign 2001 in the drawing). Furthermore, because the EP4 will be prevented from supporting the VH (3) at the time of this change, the hot remove process for preventing the VH (3) from being supported in the EP4 is carried out. In addition, the hot add process for supporting the VH (4) in the EP4 is carried out. While the above-mentioned hot add process and hot remove process are being carried out, it will become difficult (or impossible) to control a data transfer related to the EP4 on the VH (3) and the VH (4), but since the CPU1 is able to control the transfer of data from either the EP3 or the EP4 to the EP2 (that is, from the CM 209 to the BEIF 210) by way of the RP1 on the VH (1), and, furthermore, the CPU3 is able to control the transfer of data from the EP3 to the EP2 (that is, from the CM 209 to the BEIF 210) by way of the RP3 on the VH (3) (refer to reference sign 2003 in the drawing), the storage system 10 is able to continue the FE-BE data transfer.

Further, the state in which the RP1 and the RP2 are respectively able to access the EP1 is maintained as-is, but the mapping that enables the RP3 and the RP4 to access the EP2 is changed. That is, the EP2-supported VHs change from VH (1) and VH (3) to VH (3) and VH (4) (refer to reference sign 2002 in the drawing). Furthermore, since the EP2 is prevented from supporting the VH (1) at the time of this change, the hot remove process is carried out for preventing the VH (1) from being supported in the EP2. In addition, the hot add process is carried out for supporting the VH (4) in the EP2. While the above-mentioned hot remove process and hot add process are being carried out, it becomes difficult (or impossible) to control the data transfer related to the EP2 on the VH (1) and VH (4), but since the CPU3 is able to control the transfer of data via the RP3 on the VH(3) from the EP3 to the EP2 (that is, from the CM 209 to the BEIF 210) (refer to reference sign 2003 in the drawing), the storage system 10 is able to continue the FE-BE data transfer. That is, in accordance with the augmentation method related to this example, it is possible to add the CPU4 while operating the storage system 10 as-is (maintaining as-is the state in which a request is received from the higher-level device).

Figure 21:
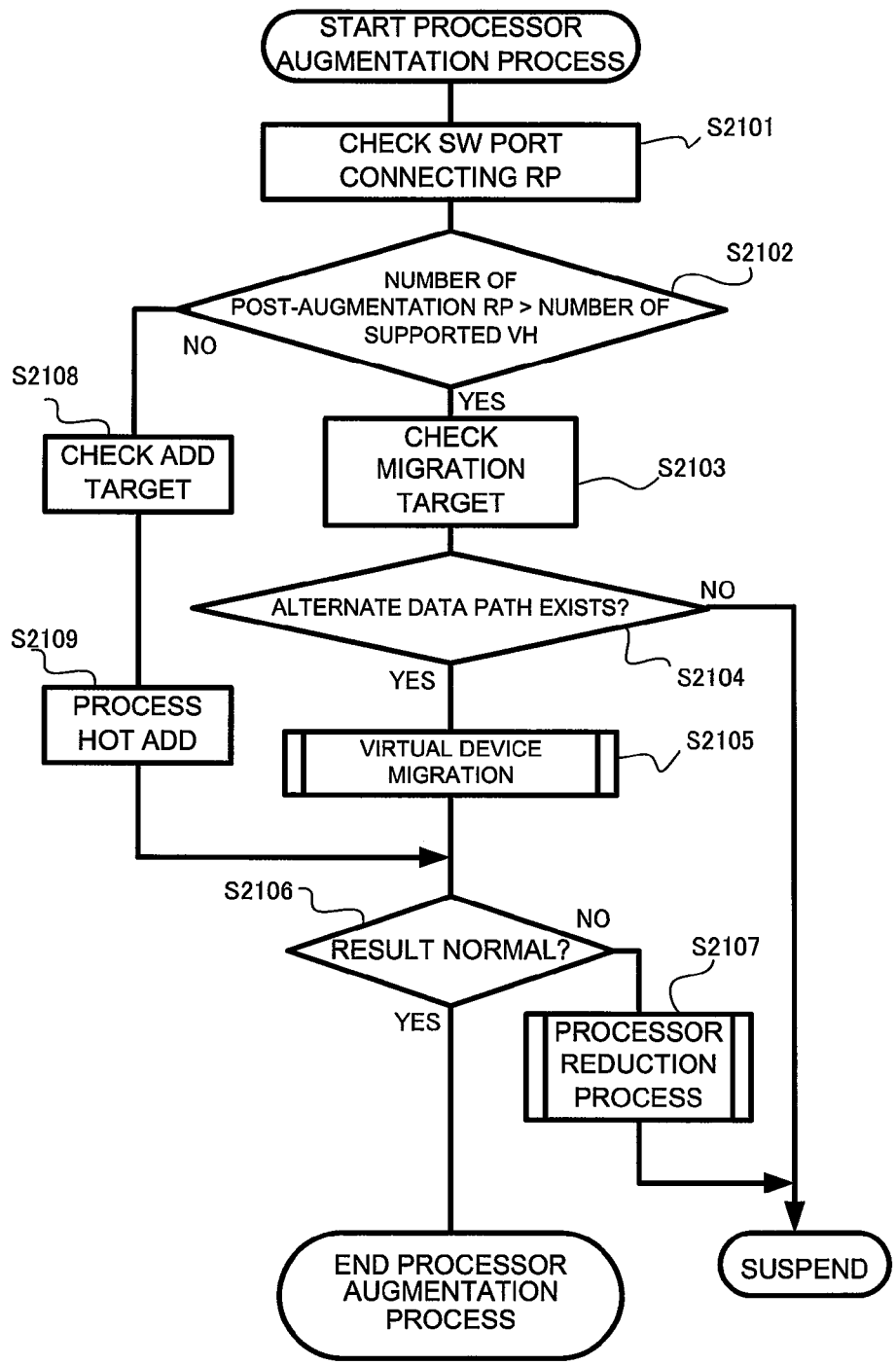
FIG. 21 is a flowchart showing a processor augmentation process related to the fifth example.

FIG. 21 is a flowchart of the processor augmentation process related to the fifth example.

Furthermore, the controller 20 is given as the entity that executes this process, but actually this processing is executed in accordance with the processor 201 (the processor 201 connected to the memory 202 in which the MR-PCIM is stored) inside the controller 20 executing prescribed computer programs (the MR-PCIM and the computer program executed together therewith). Furthermore, in a case where the MR-PCIM is loaded in the SVP 30, the SVP 30 (more accurately, the processor on the SVP 30 that executes the MR-PCIM) becomes the entity that executes this processing. The same processing entities realize the processor augmentation process and the failover method in the other examples.

Further, in the following explanation, the EP as the component of the VH will be called a "virtual device". For example, in a case where the EP1 supports the VH (1) and the VH (2), the EP1 as a component of the VH (1) (the EP1 on the VH (1)) and the EP1 as a component of the VH (2) (the EP1 on the VH (2)) both constitute virtual devices. Further, the processor 201 added in accordance with this augmentation process will be called an "augmented processor", and the RP 204 associated with this augmented processor 201 (the RP 204 included in the RC230 to which the augmented processor 201 is connected) will be called an "augmented RP".

First, the Administrator checks the upstream port (hereinafter referred to as the "target port" in the explanations of FIGS. 21 through 23) of the switch 205 connected to the augmented RP 204 (S2101). The Administrator uses the MR-PCIM to issue an instruction to the controller 20, and the controller 20 enables the virtual switch (hereinafter referred to as a "target virtual switch" in the explanations of FIGS. 21 through 23) 230 corresponding to the target port in the switch 205. That is, the controller 20 associates the target port with the upstream bridge of the virtual switch 230 corresponding to the target port.

Thereafter, the controller 20 of the storage system 10 carries out the following processing for each EP. One EP (hereinafter referred to as a "target EP" in the explanations of FIGS. 21 through 23) will be given as an example and explained here.

The controller 20 determines whether or not the number of post-augmentation RP 204 is larger than the maximum number of supported VHs of the target EP (S2102). In accordance with this determination, the controller 20 is able to determine with respect to a target EP whether or not a process, which migrates the virtual device corresponding to this target EP (hereinafter the "virtual device migration process"), is necessary.

In Step S2102, in a case where the determination is that the number of post-augmentation RP240 is larger than the maximum number of supported VHs of the target EP (S2102: YES), the Administrator checks the migration-targeted virtual device (the virtual device (any of a plurality) corresponding to the target EP, hereinafter referred to as a "target virtual device" in the explanations of FIGS. 21 through 23) (S2103). For example, the Administrator is able to carry out the above-mentioned checks, for example, by operating a screen like that shown in FIG. 24 on the SVP 30. In the operation screen of FIG. 24, when the Administrator selects a processor 201 from a pull-down menu 3701, a list 3702 of virtual devices logically connected to the RP 204 associated with this selected processor 201 is displayed. The target virtual device is included in the list 3702.

Figure 25:
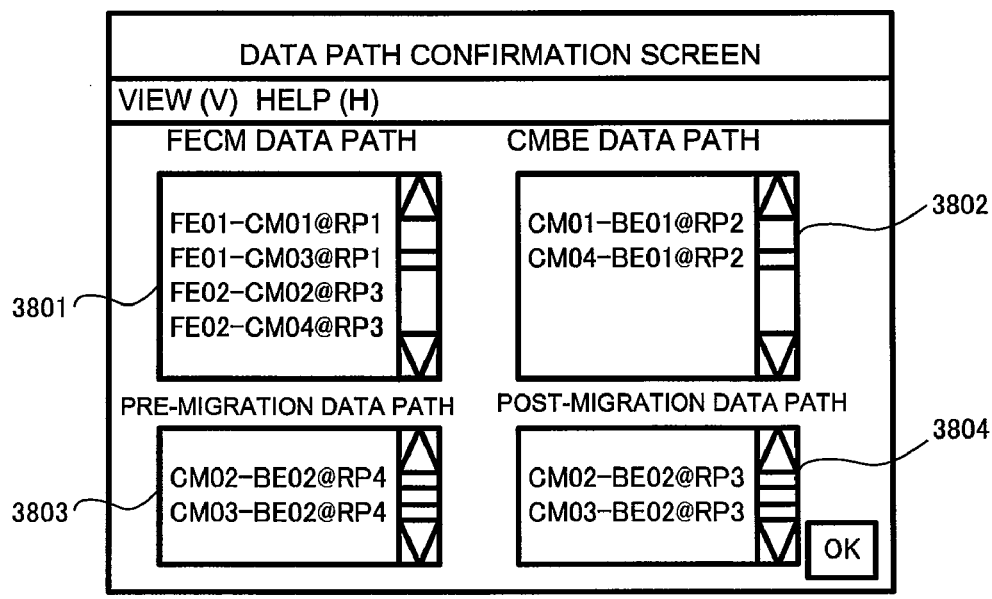
FIG. 25 is a diagram showing an example of a data path confirmation screen.

Next, the Administrator checks whether or not there exists an alternate path (hereinafter simply referred to as an "alternate path") with respect to the data path that will be unusable during the execution of the virtual device migration process (S2104). For example, the Administrator is able to carry out the above-mentioned check, for example, by operating a screen like that shown in FIG. 25 on the SVP 30. In the operation screen of FIG. 25, a list 3801 of data paths on the FE side (FE-CM), a list 3802 of data paths on the BE side (CM-BE), a list 3803 of data paths that were available prior to executing the virtual device migration process, and a list 3804 of data paths that become available after executing the virtual device migration process are displayed.

In a case where an alternate path does not exist (S2104: NO), processing is suspended.

By contrast, in a case where an alternate path exists (S2104: YES), the controller 20 executes the virtual device migration process (S2105). In accordance with the virtual device migration process being carried out, the VH of the target virtual device (the VH that has the target virtual device as a component) is changed. Hereinafter, a pre-change VH will be called a "migration-source VH", and a post-change VH will be called a "migration-destination VH". The virtual device migration process will be explained in detail below by referring to FIG. 22.

Thereafter, the Administrator checks whether or not the migration of the target virtual device was carried out normally (S2106). For example, the Administrator confirms that the target virtual device is included in the list 3702 of virtual devices logically connected to the RP 204 of the migration-destination VH in the operation screen of FIG. 24.

In a case where the migration of the target virtual device has failed (S2106: NO), the controller 20 executes a process (hereinafter "processor reduction process") for reducing the augmented processor 201 by returning to the state prior to the execution of the migration (S2107). For example, when the migration of a portion of the virtual devices succeeded in a case where the augmented processor 201 is defective, the controller 20 re-migrates the successful virtual devices to the original VH (the migration-source VH). The processor reduction process will be explained in detail below by referring to FIG. 23.

By contrast, in a case where the determination in Step S2102 is that the number of post-augmentation RP 204 is equal or less than the maximum number of supported VHs of the target EP (S2102: YES), the Administrator checks the virtual device added in accordance with the hot add process (S2108). For example, the Administrator is able to carry out the above check, for example, by operating a screen like that shown in FIG. 24 on the SVP 30.

Thereafter, the controller 20 executes the hot add process (S2109). Thereafter, the same as after the virtual device migration process was carried out, the Administrator checks whether or not the hot add process was carried out normally (S2106).

Figure 22:
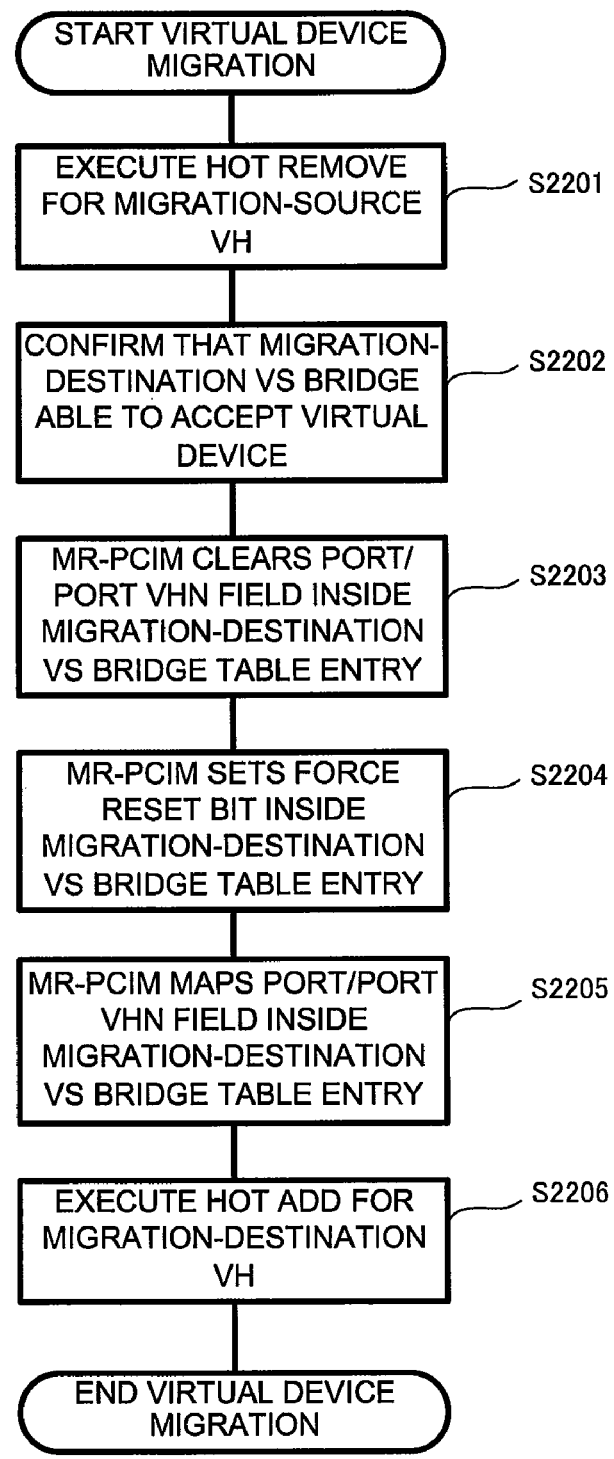
FIG. 22 is a flowchart showing a virtual device migration process.

FIG. 22 is a flowchart of the virtual device migration process.

First, the controller 20 executes the hot remove process for the target virtual device (S2201). In accordance with this, the target virtual device is deleted from the migration-source VH (the target virtual device ceases to be a component of the migration-source VH).

Next, the controller 20 checks that the downstream bridge of the virtual switch (the virtual switch corresponding to the upstream port connected to the RP 204 of the migration-destination VH) 230 related to the migration-destination VH is currently unused, and, in addition, is usable (S2202).

Next, the controller 20 clears the Port/Port VHN field (the field in which the association information of the bridges 1501, 1502 and the port 206 is recorded) inside a VS Bridge table (the table that manages the association between the bridges 1501, 1502, and the port 206) of the downstream bridge to which is connected the target virtual device of the virtual switch 230 related to the migration-source VH (S2203).

Thereafter, the controller 20 sets the Force Reset bit for the VS Bridge table of the downstream bridge to which is connected the target virtual device of the virtual switch 230 related to the migration-destination VH, and clears the Port/Port VHN field (S2204).

Thereafter, the controller 20 maps the Port/Port VHN field for the VS Bridge table of the downstream bridge to which is connected the target virtual device of the virtual switch 230 related to the migration-destination VH such that the target virtual device is connected to the virtual switch 230 related to the migration-destination VH (S2205).

Thereafter, the controller 20 executes the hot add process for adding the target virtual device to the migration-destination VH (S2206).

Figure 23:
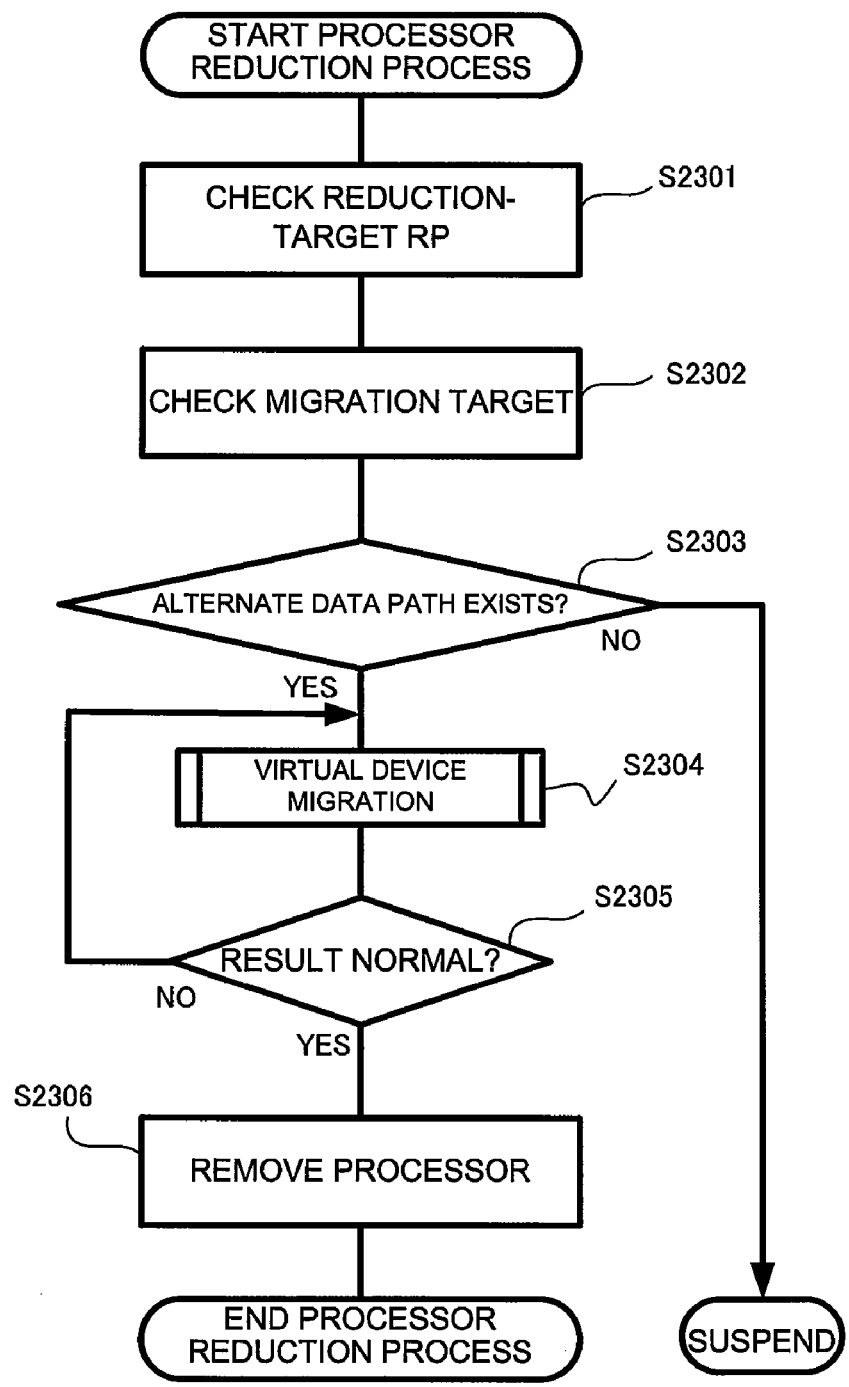
FIG. 23 is a flowchart showing a processor reduction process.
Figure 24:
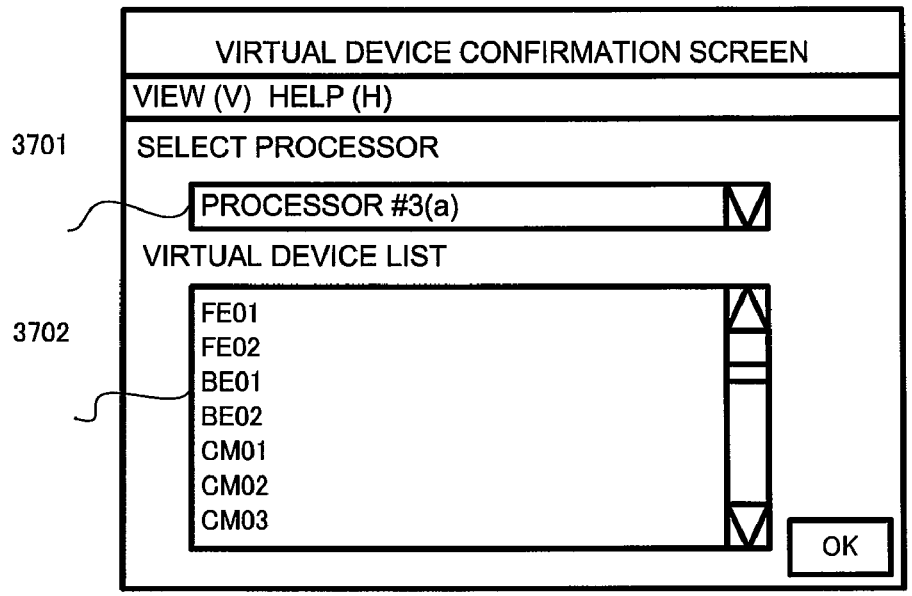
FIG. 24 is a diagram showing an example of a virtual device confirmation screen.

FIG. 23 is a flowchart of the processor reduction process.

First, the Administrator examines the reduction-targeted processor 201, and checks the reduction-targeted RP 204 (the RP 204 associated to the reduction-targeted processor 201) and the VH thereof (S2301).

Next, the Administrator checks the virtual device that is targeted for re-migration (that is, the target virtual device that was migrated in the virtual device migration process) (S2302).

Next, the Administrator checks whether or not there exists an alternate path for the data path that will not be able to be used during the re-migration (S2303). A case in which an alternate path does not exist signifies that the transfer of data between CM-BE will not be able to be carried out during the re-migration.

In a case where an alternate data path does not exist (S2303: NO), processing is suspended.

By contrast, in a case where an alternate path exists (S2303: YES), the controller 20 carries out the re-migration (S2304). The re-migration process is substantially the same as the virtual device migration process explained using FIG. 22.

Thereafter, the Administrator checks whether or not the re-migration was carried out normally (S2305). For example, in the operation screen of FIG. 24, a case in which the target virtual device is not included in the list 3702 of virtual devices logically connected to the RP 204 of the migration-destination VH (the migration-destination VH in the re-migration) constitutes a failure.

In a case where the re-migration fails (S2305: NO), the controller 20 carries out the re-migration once again (S2304).

By contrast, in a case where the re-migration succeeds (S2305: YES), the augmented processor 201 is physically removed from the storage system 10 (S2306).

Example 6

A processor 201 augmentation method related to a sixth example will be explained below by referring to FIGS. 26 through 33. Furthermore, in this example, it is supposed that the maximum number of supported VHs for each EP is "4".

Figure 26:
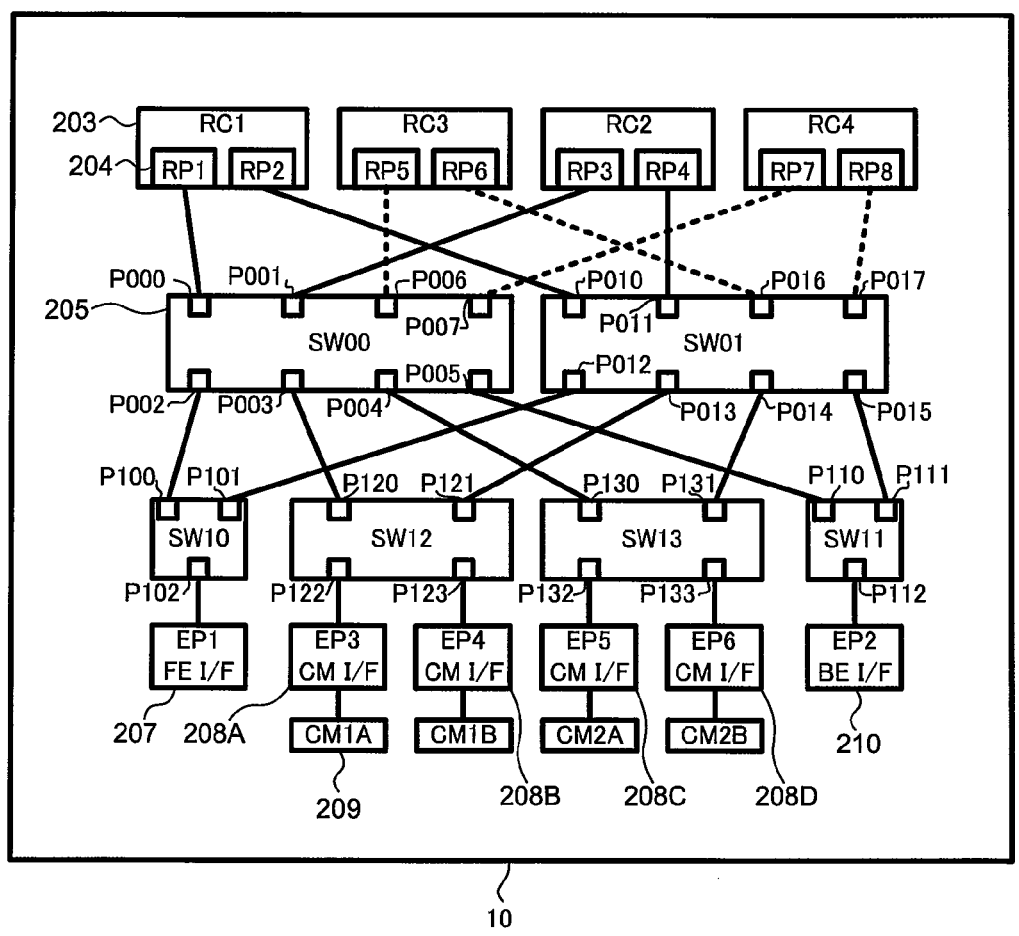
FIG. 26 is a diagram showing the topology of the internal network of the storage system in an augmentation method related to a sixth example.

FIG. 26 is a diagram showing the topology of the internal network of the storage system 10 in an augmentation method related to the sixth example.

Other than the number of RC203 and RP 204, and the number of ports of SW00 and SW01, the topology of FIG. 26 is the same as the topology of the internal network of the storage system 10 (the storage system 10 of FIG. 8) related to the third example.

Furthermore, although not shown in the drawing, the CPU1 is connected to the RC1, the CPU2 is connected to the RC2, the CPU3 is connected to the RC3, and the CPU4 is connected to the RC4, respectively. Therefore, the CPU1 controls a data transfer via the RP1 on the VH (1), the CPU2 controls a data transfer via the RP3 on the VH (3), the CPU3 controls a data transfer via the RP5 on the VH (5), and the CPU4 controls a data transfer via the RP7 on the VH (7), respectively. Then, the CPU1 controls a data transfer via the RP2 on the VH (2), the CPU2 controls a data transfer via the RP4 on the VH (4), the CPU3 controls a data transfer via the RP6 on the VH (6), and the CPU4 controls a data transfer via the RP8 on the VH (8), respectively.

In this example, it is supposed that four RP 204 (RP1 through RP4) are connected in the initial state. Then, in accordance with the augmentation method explained hereinbelow, four RP240 (RP5 through RP8) are newly connected. That is, in the initial state, the CPU1 and the CPU2 are mounted, and in accordance with the augmentation method explained below, the CPU3 and the CPU4 are added.

Figure 27:
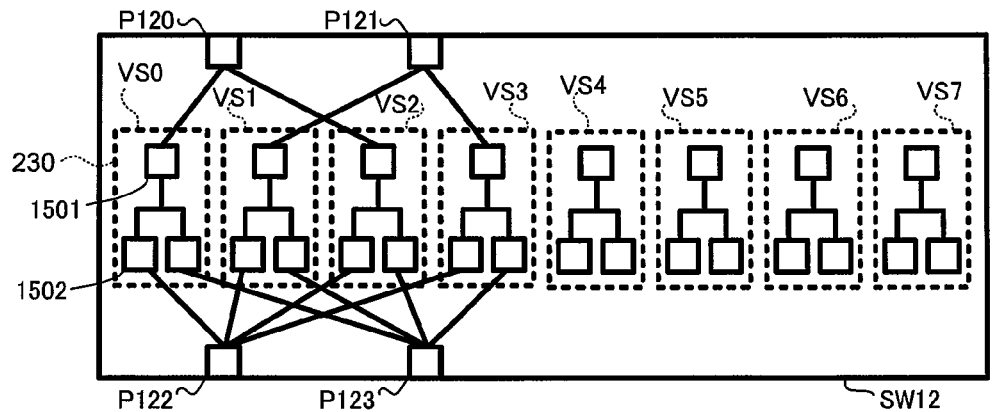
FIG. 27 is a diagram showing the internal configuration of an initialized switch SW12 in the augmentation method related to the sixth example.

FIG. 27 shows the internal configuration of the SW12 in the initial state.

Since the SW12 is connected to a maximum of eight RP 204 (RP1 through RP8), the SW12 comprises eight virtual switches 230 (VS0 through VS7).

In the initial state, four virtual switches 230 (VS0 through VS3), which correspond to the upstream ports P120, P121 connected to the RP1 through RP4 by way of SW00 or SW01, are enabled. That is, the upstream bridge 1501 of each virtual switch 230 is associated with the upstream port of either P120 or P121. Further, the downstream bridge 1502 of each virtual switch 230 is associated with the downstream ports P122 and P123.

Figure 28:
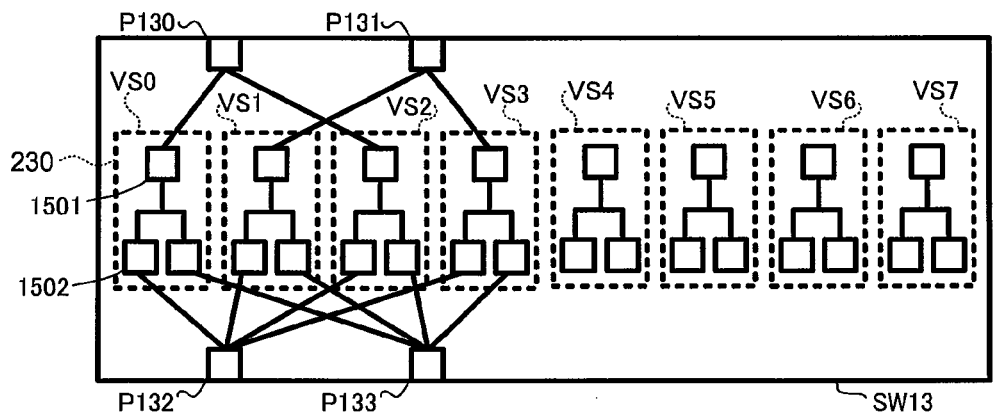
FIG. 28 is a diagram showing the internal configuration of an initialized switch SW13 in the augmentation method related to the sixth example.

Furthermore, FIG. 28 shows the internal configuration of SW13 in the initial state, but the internal configuration of SW13 is substantially the same as that of SW12.

Figure 29:
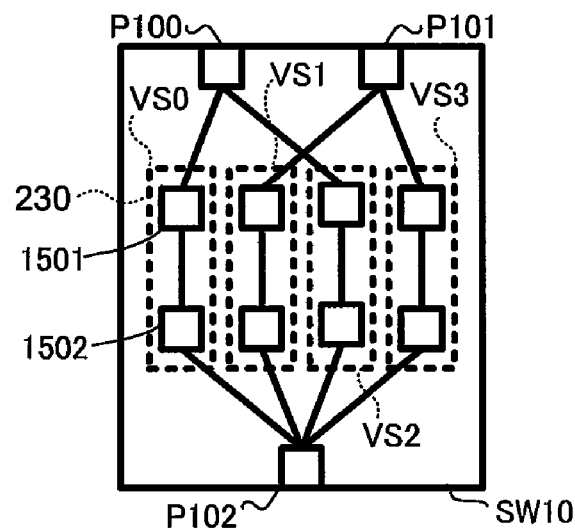
FIG. 29 is a diagram showing the internal configuration of an initialized switch SW10 in the augmentation method related to the sixth example.

FIG. 29 shows the internal configuration of the SW10 in the initial state.

Since the SW10 is connected to a maximum of four RP 204 by way of the SW00 or the SW01, the SW10 comprises four virtual switches 230 (VS0 through VS3).

In the initial state, four virtual switches 230 (VS0 through VS3), which correspond to the upstream ports P100, P101 connected to the RP1 through RP4 by way of SW00 or SW01, are enabled. That is, the upstream bridge 1501 of each virtual switch 230 is associated with the upstream port of either P100 or P101. Further, the downstream bridge 1502 of each virtual switch 230 is associated with the downstream port P102.

Figure 30:
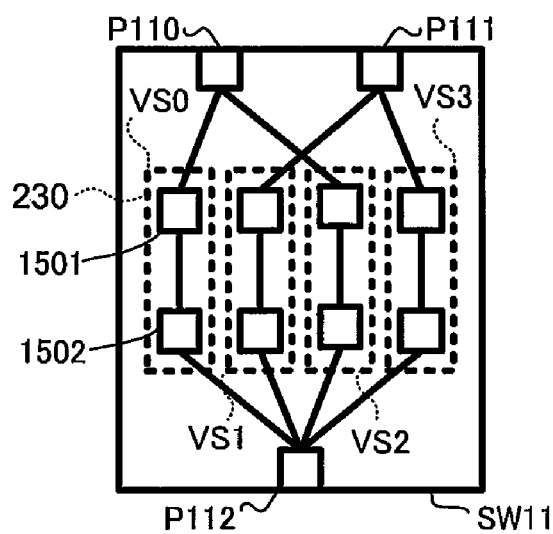
FIG. 30 is a diagram showing the internal configuration of an initialized switch SW11 in the augmentation method related to the sixth example.

Furthermore, FIG. 30 shows the internal configuration of the SW11 in the initial state, but the internal configuration of the SW11 is substantially the same as that of the SW10. Further, the internal configurations of the SW00 and the SW01 in the initial state are substantially the same as those explained using FIG. 15.

FIG. 31 is a diagram showing the mapping table 400 in the initial state.

In the initial state, since the maximum number of supported VHs ("4") of each EP is equal to or greater than the number of connected RP 204 ("4"), as shown in FIG. 31, the respective RP1 through RP4 are able to access all of the EPs.

FIG. 32 is a diagram showing the mapping table 400 in a case where the CPU3 has been added (a case where the RP5 and the RP6 have been connected).

Since the maximum number of supported VHs ("4") for each EP is smaller than the number of connected RP 204 ("6"), not all of the RP1 through RP6 are able to access these EPs. Accordingly, the mapping is changed as follows. That is, in this example, the mapping is changed such that the association relationship between each EP and the four RP 204, which combine the two RP 204 (RP2 and RP4) that were already connected with the two RP 204 (RP5 and RP6) that were newly added, constitutes the state shown in FIG. 9.

Specifically, the EP3-supported VHs change from VH (1), VH (2), VH (3) and VH (4) to VH (1), VH (2), VH (3) and VH (5). Further, the EP4-supported VHs change from VH (1), VH (2), VH (3) and VH (4) to VH (1), VH (3), VH (4) and VH (6). Further, the EP5-supported VHs change from VH (1), VH (2), VH (3) and VH (4) to VH (1), VH (2), VH (3) and VH (6). Further, the EP6-supported VHs change from VH (1), VH (2), VH (3) and VH (4) to VH (1), VH (3), VH (4) and VH (5). Further, the EP2-supported VHs change from VH (1), VH (2), VH (3) and VH (4) to VH (1), VH (3), VH (5) and VH (6). That is, the virtual device corresponding to the EP3 on the VH (4) is migrated to the VH (5). Further, the virtual device corresponding to the EP4 on the VH (2) is migrated to the VH (6). Further, the virtual device corresponding to the EP5 on the VH (4) is migrated to the VH (6). Further, the virtual device corresponding to the EP6 on the VH (2) is migrated to the VH (5). Further, the virtual device corresponding to the EP2 on the VH (2) is migrated to the VH (5), and the virtual device corresponding to the EP2 on the VH (4) is migrated to the VH (6). The contents of the specific processing for realizing these migrations are the same as those explained using FIG. 22.

Furthermore, while migration processing is being carried out, the CPU1 is able to control data transfers between both FE-CM and CM-BE by way of the RP1 on the VH (1), and the CPU2 is able to control data transfers between both FE-CM and CM-BE by way of the RP3 on the VH (3). Therefore, the storage system 10 is able to continue transferring data between FE-BE even while the migration process is being carried out. That is, in accordance with the augmentation method related to this example, it is possible to add the CPU3 while operating the storage system 10 as-is (maintaining as-is the state in which a request is received from the higher-level device).

FIG. 33 is a diagram showing the mapping table 400 in a case where the CPU4 has been added in addition to the CPU3 (a case where the RP7 and the RP8 are also connected).

Since the maximum number of supported VHs ("4") for each EP is smaller than the number of connected RP 204 ("8"), not all of the RP1 through RP8 are able to access these EPs. Accordingly, the mapping is changed as follows. That is, in this example, the mapping is changed such that the association relationship between each EP and the four RP 204, which combine the two RP 204 (RP1 and RP3) that were already connected with the two RP 204 (RP7 and RP8) that were newly added, constitutes the state shown in FIG. 9.

Specifically, the EP3-supported VHs change from VH (1), VH (2), VH (3) and VH (5) to VH (2), VH (3), VH (5) and VH (7). Further, the EP4-supported VHs change from VH (1), VH (3), VH (4) and VH (6) to VH (1), VH (4), VH (6) and VH (8). Further, the EP5-supported VHs change from VH (1), VH (2), VH (3) and VH (6) to VH (2), VH (3), VH (6) and VH (8). Further, the EP6-supported VHs change from VH (1), VH (3), VH (4) and VH (5) to VH (1), VH (4), VH (5) and VH (7). Further, the EP2-supported VHs change from VH (1), VH (3), VH (5) and VH (6) to VH (5), VH (6), VH (7) and VH (8). That is, the virtual device corresponding to the EP3 on the VH (1) is migrated to the VH (7). Further, the virtual device corresponding to the EP4 on the VH (3) is migrated to the VH (8). Further, the virtual device corresponding to the EP5 on the VH (1) is migrated to the VH (8). Further, the virtual device corresponding to the EP6 on the VH (3) is migrated to the VH (7). Further, the virtual device corresponding to the EP2 on the VH (1) is migrated to the VH (7), and the virtual device corresponding to the EP2 on the VH (3) is migrated to the VH (8). The contents of the specific processing for realizing these migrations are the same as those explained using FIG. 22.

Furthermore, while migration processing is being carried out, the CPU1 is able to control a data transfer between FE-CM by way of the RP2 on the VH (2), and the CPU2 is able to control a data transfer between FE-CM by way of the RP4 on the VH (4). The previously augmented CPU3 is able to control a data transfer between CM-BE by way of either the RP5 or the RP6 on either the VH (5) or the VH (6). Therefore, the storage system 10 is able to continue transferring data between FE-BE even while the migration process is being carried out. That is, in accordance with the augmentation method related to this example, it is possible to add the CPU4 while operating the storage system 10 as-is (maintaining as-is the state in which a request is received from the higher-level device).

In the processor 201 augmentation method related to this example, first, the data transfer path between the CM-BE is checked to make sure it will be possible to continue operation during the augmentation process. Then, the mapping is changed so that the already mounted processor 201 controls the FE-CM data transfer, and the newly added processor 201 controls the CM-BE data transfer. In accordance with this, it becomes possible to add the CPU4 while operating the storage system 10 as-is.

Example 7

A processor 201 augmentation method related to a seventh example will be explained below by referring to FIGS. 34 through 37. Furthermore, in the augmentation method related to this example, the topology of the internal network of the storage system 10 is the same as that of the sixth example (the topology shown in FIG. 26). Further, in this example, the maximum number of supported VHs for each EP is "4" the same as the sixth example.

In the processor 201 augmentation method related to the sixth example, in the case of a single RC203, the two RP 204 disposed in this RC203 are both used to control the transfer of data in the same zone (either between the FE-CM or between the CM-BE). That is, each processor 201 controls the data transfer of either one of the FE side or the BE side. In a configuration like this, in a case where most of the requests received from the higher-level device have a high CM 209 hit ratio (that is, requests for which processing ends with the FE-side data transfer), the utilization efficiency of the processor 201 deteriorates (that is, it is not possible to make full use of the capabilities of the processor 201 that controls the BE-side data transfer). The seventh example takes this point into account. In the processor 201 augmentation method related to the seventh example, each processor 201 is able to control the data transfers of both the FE side and the BE side even after a processor 201 has been added.

FIG. 34 is a diagram showing the mapping table 400 in the initial state.

In the initial state, the RP1 and the RP3 are able to access the FEIF 207 (EP1) and the CMIF 208 (any two or more of the EP3 through the EP6). Alternately, the RP2 and the RP4 are able to access the BEIF 210 (EP2) and the CMIF 208 (any two or more of the EP3 through the EP6). As a result of this, each processor 201 is able to control the transfer of data on both the FE side and the BE side. This differs from the processor 201 augmentation method related to the sixth example in that each RP 204 is not able to access all the EPs even in a case where the maximum number of supported VHs of each EP is equal to or greater than the number of connected RP 204.

FIG. 35 is a diagram showing the mapping table 400 in a case where the CPU3 is added (a case where the RP5 and the RP6 are connected).

As shown in FIG. 35, the mapping of the RP5 and the RP6 is set the same as that of the RP1 and the RP2.

FIG. 36 is a diagram showing the mapping table 400 in the case where the CPU4 is added in addition to the CPU3 (a case where the RP7 and the RP8 are also connected).

As shown in FIG. 36, the mapping of the RP7 and the RP8 is set the same as that of the RP3 and the RP4.

In accordance with setting the map status of FIG. 34 in a repetitive manner in units of the four RP 204 to be augmented like this, the augmented processor 201 is able to control the data transfers on both the FE side and the BE side. Since a processor 201 augmentation method like this is realized in accordance with a hot add process for the unused function unit 212 of each EP with respect to the augmented RP 204, this augmentation method is characterized by the fact that it does not impact the already set VH. That is, operation in the VH of an already set RP 204 is able to continue even during the RP 204 augmentation process.

Figure 37:
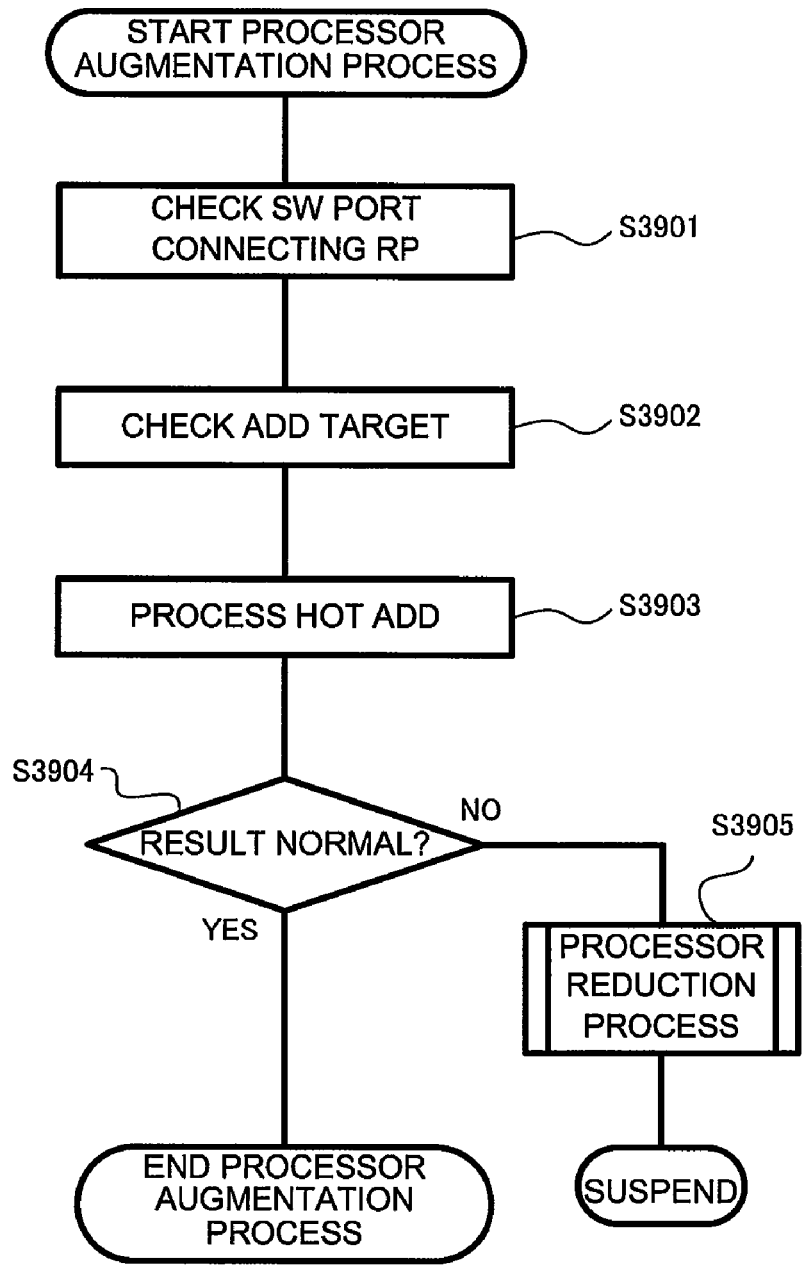
FIG. 37 is a flowchart of a processor augmentation process related to the seventh example.

FIG. 37 is a flowchart of the processor augmentation process related to the seventh example.

First, the Administrator checks the upstream port (hereinafter referred to as the "target port" in the explanation of FIG. 37) of the switch 205 connected to the augmented RP 204 (S3901). The Administrator uses the MR-PCIM to issue an instruction to the controller 20, and the controller 20 enables the virtual switch (hereinafter referred to as the "target virtual switch" in the explanation of FIG. 37) 230 corresponding to the target port in the switch 205. That is, the controller 20 associates the target port with the upstream bridge of the virtual switch 230 corresponding to the target port.

Next, the Administrator checks the virtual device, which has become the target of the hot add process (S3902). For example, the Administrator is able to carry out the above-mentioned check by operating a screen like that shown in FIG. 24 on the SVP 30.

Thereafter, the controller 20 executes the hot add processes for function units 212, which are the target of the hot add process of each EP and which are an unused (S3903).

Thereafter, the Administrator checks whether or not the hot add process was carried out normally (S3904). In the case of a success (S3904: YES), processing ends.

By contrast, in a case where the hot add process fails due to a defect in the augmented processor 201 (S3904: NO), the controller 20 executes the processor reduction process for removing the RP 204, and suspends the processor augmentation process (S3905).

Example 8

Figure 38:
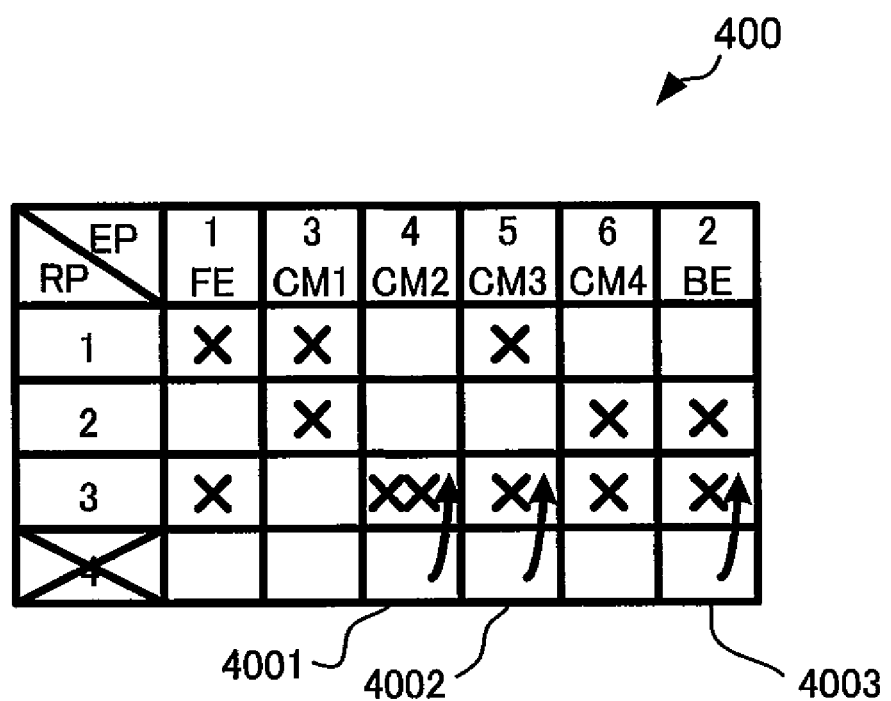
FIG. 38 is a diagram showing a mapping table subsequent to the execution of a failover method related to an eighth example.
Figure 39:
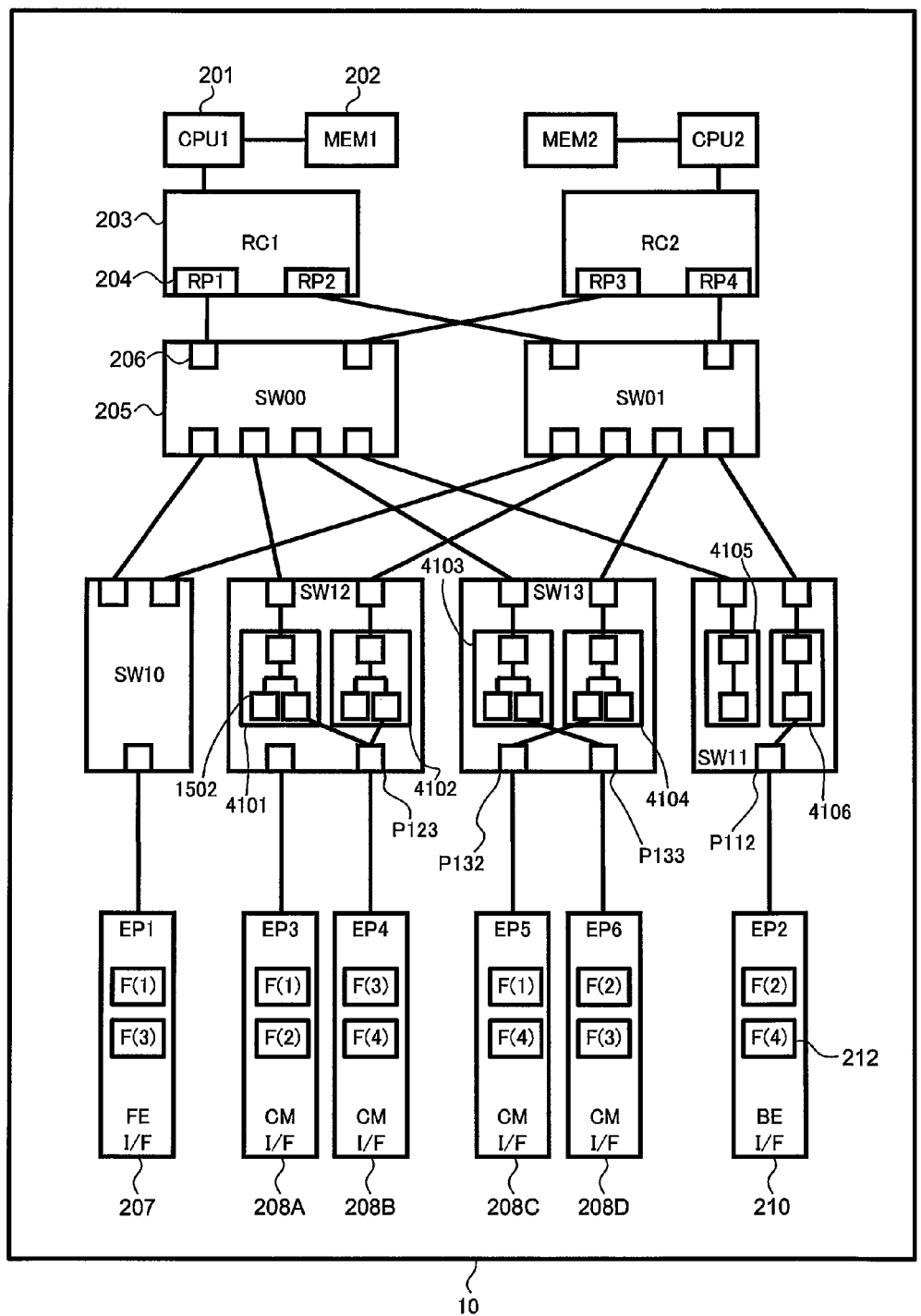
FIG. 39 is a diagram showing an example of the configuration of the storage system prior to the execution of the failover method related to the eighth example.
Figure 40:
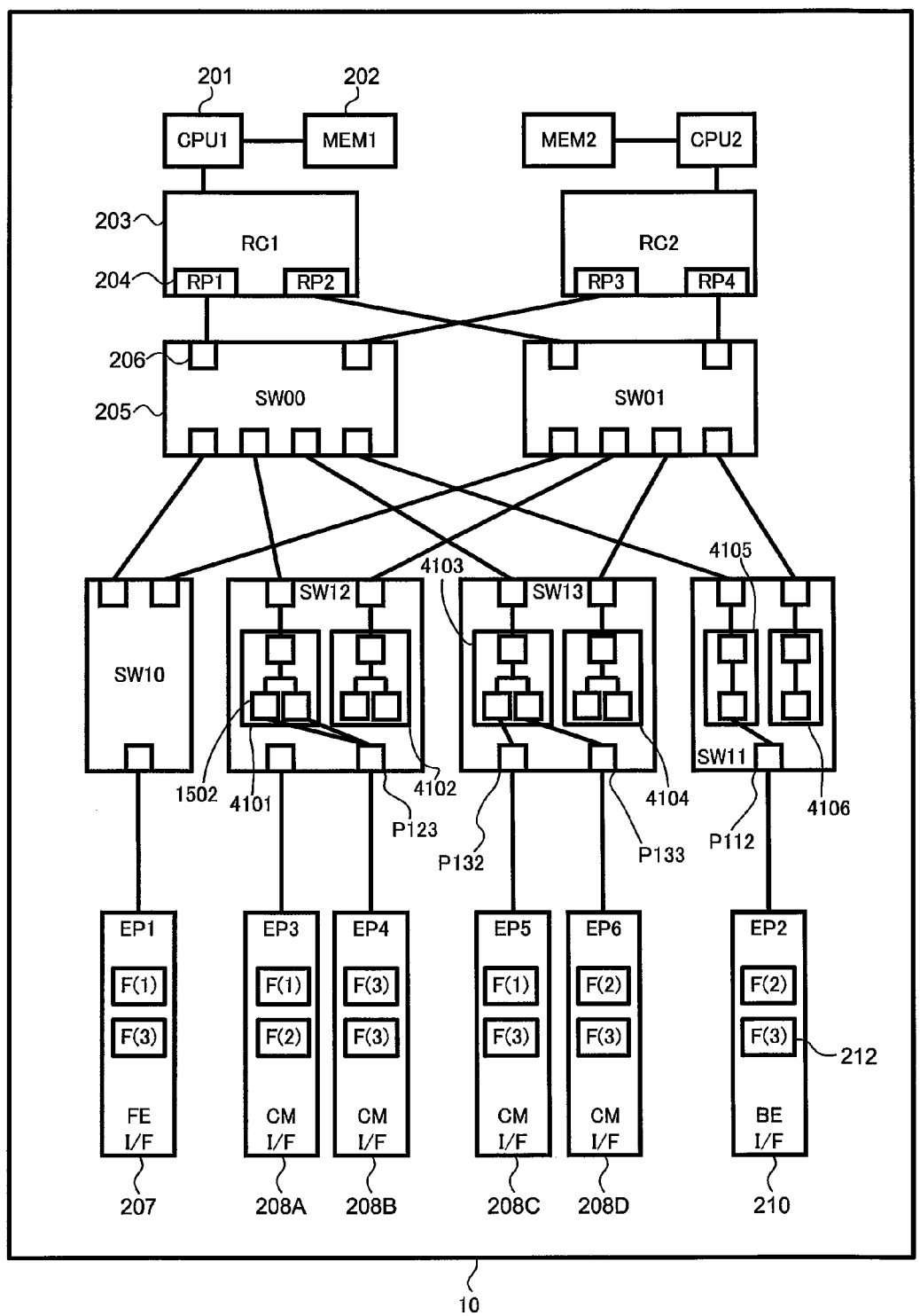
FIG. 40 is a diagram showing an example of the configuration of the storage system subsequent to the execution of the failover method related to the eighth example.

FIGS. 38 through 40 are diagrams illustrating a failover method. When the storage system 10 related to this example is in accordance with the configurations of FIGS. 8 and 9, the respective RP 204 are not able to access all the EPs. Therefore, in a case where a failure occurs in a certain VH, the virtual device mapped to this VH becomes unusable. Accordingly, the storage system 10 related to this example realizes a failover in accordance with executing a virtual device migration from the failed VH to a normal VH.

FIG. 38 is a diagram showing the mapping table 400 subsequent to a failover method related to this example being executed.

Mapping in a case where a failure has not occurred (at normal operation) is the same as FIG. 9. A case in which a failure has occurred in the VH of the RP4 will be considered here. During normal operation, the RP4 was able to access three EPs (EP2, EP4 and EP5). The virtual device is migrated (refer to reference signs 4001, 4002, and 4003 in the drawing) so that these three virtual devices are able to be accessed from the RP3. Because the RP3 is already able to access the EP4 here, the RP3 will access the two function units 212 included in the EP4 after the virtual device migration has been executed.

FIG. 39 is a diagram showing an example of the configuration of the storage system 10 prior to a failover method related to this example being executed.

The configuration of the virtual switches 230 inside the respective switches 205 shows the parts (the virtual switches 230 related to the VH (3) and the VH (4)) that are changed by this failover method.

The virtual switch 4101 inside the SW12 is the virtual switch 230 related to the VH (3), and the downstream bridge 1502 thereof is associated with the downstream port P123. Further, the virtual switch 4102 inside the SW12 is the virtual switch 230 related to the VH (4), and the downstream bridge 1502 thereof is associated with the downstream port P123.

The virtual switch 4103 inside the SW13 is the virtual switch 230 related to the VH (3), and the downstream bridge 1502 thereof is associated with the downstream port P133. Further, the virtual switch 4104 inside the SW13 is the virtual switch 230 related to the VH (4), and the downstream bridge 1502 thereof is associated with the downstream port P132.

The virtual switch 4105 inside the SW11 is the virtual switch 230 related to the VH (3), and the downstream bridge 1502 thereof is not associated with the downstream port. Further, the virtual switch 4106 inside the SW11 is the virtual switch 230 related to the VH (4), and the downstream bridge 1502 thereof is associated with the downstream port P112.

FIG. 40 is a diagram showing an example of the configuration of the storage system 10 after the failover method related to this example has been executed.

The two downstream bridges 1502 of the virtual switch 4101 inside the SW12 (the virtual switch 230 related to the VH (3)) are associated with the downstream port P123. Further, the downstream bridge 1502 of the virtual switch 4102 inside the SW12 (the virtual switch 230 related to the VH (4)) is not associated with the downstream port.

The two downstream bridges 1502 of the virtual switch 4103 inside the SW13 (the virtual switch 230 related to the VH (3)) are respectively associated with the downstream ports P133 and P133. Further, the downstream bridge 1502 of the virtual switch 4104 inside the SW13 (the virtual switch 230 related to the VH (4)) is not associated with the downstream port.

The downstream bridge 1502 of the virtual switch 4105 inside the SW11 (the virtual switch 230 related to the VH (3)) is associated with the downstream port P112. Further, the downstream bridge 1502 of the virtual switch 4106 inside the SW11 (the virtual switch 230 related to the VH (4)) is not associated with the downstream port.

As shown in FIGS. 39 and 40, the virtual device is migrated and the failover is realize by the associations between the downstream bridges 1502 of the virtual switches 230 and the downstream ports being changed. Further, in order to enable the execution of this migration, at least two downstream bridges 1502 are disposed in the virtual switches 230 inside the switches 205 (SW12 and SW13) connected to the EPs.

The numerous examples of the present invention described above are simply examples for explaining the present invention, and do not purport to limit the scope of the present invention to these examples. The present invention may also be put into practice using a variety of other modes without departing from the gist thereof.

REFERENCE SIGNS LIST

10 Storage system
20 Controller
201 Processor
202 Memory
203 Root complex (RC)
204 Root port (RP)
205 Switch
206 Port
207 Front-end interface (FEIF)
208 Cache memory interface (CMIF)
209 Cache memory (CM)
210 Back-end interface (BEIF)
211 Disk array (DA)
212 Function unit
30 SVP

The invention claimed is:

1. A storage system comprising:
   a storage device in which data that is to be read or written from a higher-level device is stored;

a plurality of memories in which either write-targeted data received from the higher-level device or read-targeted data read out from the storage device is temporarily stored;

a first-interface device, which is coupled to the higher-level device, and which controls input/output of data to/from the higher-level device;

a second-interface device, which is coupled to the storage device, and which controls input/output of data to/from the storage device;

a plurality of third-interface devices, which are coupled to the plurality of memories, and which control the input/output of data to/from the plurality of memories;

a plurality of processors, each of which controls data transfer between the first-interface device and said memory and/or between the second-interface device and said memory in accordance with controlling any one or more of the first-through third-interface devices; and a plurality of root ports, where each of the root ports is coupled to any one of the plurality of processors, and is linked to one of the first through third-interface devices, which is controlled by the respectively coupled processor, wherein the plurality of root ports include a first root port, a second root port, a third root port and a fourth root port, the plurality of memories include a first-memory and a second-memory, the plurality of processors include a first processor and a second processor, the plurality of third-interface devices include a first third-interface device that is coupled to the first-memory, and a second third-interface device that is coupled to the second-memory, the first root port is linked to the first-interface device, the first third-interface device and the second third-interface device, and coupled to the first processor, the second root port is linked to the second-interface device and the first third-interface device, but not linked to the second third-interface, and coupled to the first processor, the third root port is linked to the first-interface device, the first third-interface device and the second third-interface device, and coupled to the second processor, the fourth root port is linked to the second-interface device and the second third-interface device, but not linked to the first third-interface, and coupled to the second processor, the first-interface device has a function unit for controlling the input/output of data accessible from the first root port and a function unit for controlling the input/output of data accessible from the third root port, the second interface device has a function unit for controlling the input/output of data accessible from the second root port and a function unit for controlling the input/output of data accessible from the fourth root port, the first third-interface device has a function unit for controlling the input/output of data accessible from the first root port, a function unit for controlling the input/output of data accessible from the second root port and a function unit for controlling the input/output of data accessible from the third root port, the second third-interface device has a function unit for controlling the input/output of data accessible from the first root port, a function unit for controlling the input/output of data accessible from the third root port and a function unit for controlling the input/output of data accessible from the fourth root port, the first-processor transfers to the first third-interface device and the second third-interface device write data received by the first interface device, the second-processor transfers to the first third-interface device and the second third-interface device write data received by the first interface device, the first third-interface device stores the write data in the first-memory with the corresponding function unit, the second third-interface device stores the write data in the second-memory with the corresponding function unit, the first-processor transfers the write data stored in the first-memory to the second interface device, and the second-processor transfers the write data stored in the second-memory to the second interface device.

2. The storage system according to claim 1, wherein mapping information that denotes which interface device is linked to which root port is stored in the storage system for each of the root ports, all of the first- through third-interface devices are physically coupled to each of the plurality of root ports, a case where the root port and the interface device are linked signifies that the root port and the interface device are also logically coupled, a case where the root port and the interface device are not linked signifies that the root port and the interface device are not logically coupled, whether or not the root port and the interface device are logically coupled is determined on the basis of the mapping information, and when a write request is received from the higher-level device, the first processor, which is coupled to the first root port, controls the transfer of data, which is received from the higher-level device, to each of the first-memory and the second-memory from the first-interface device, in accordance with controlling the first-interface device, the first third-interface device and the second third-interface device, the first processor, which is coupled to the second root port, controls the transfer of data, which is stored in the first-memory, to the second-interface device from the first-memory, in accordance with controlling the second-interface device and the first third-interface device, the second processor, which is coupled to the third root port, controls the transfer of data, which is received from the higher-level device, to each of the first-memory and the second-memory from the first-interface device, in accordance with controlling the first-interface device, the first third-interface device and the second third-interface device, and the second processor, which is coupled to the fourth root port, controls the transfer of data, which is stored in the second-memory, to the second-interface device from the second-memory, in accordance with controlling the second-interface device and the second third-interface device.

3. The storage system according to claim 1, wherein when a write request is received from the higher-level device, the first processor, which is coupled to the first root port, controls the transfer of data, which is received from the higher-level device, to each of the first-memory and the second-memory from the first-interface device, in accordance with controlling the first-interface device, the first third-interface device and the second third-interface device, the first processor, which is coupled to the second root port, controls the transfer of data, which is stored in the first-memory, to the second-interface device from the first-memory, in accordance with controlling the second-interface device and the first third-interface device, the second processor, which is coupled to the third root port, controls the transfer of data, which is received from the higher-level device, to each of the first-memory and the second-memory from the first-interface device, in accordance with controlling the first-interface device, the first third-interface device and the second third-interface device, and the second processor, which is coupled to the fourth root port, controls the transfer of data, which is stored in the second-memory, to the second-interface device from the second-memory, in accordance with controlling the second-interface device and the second third-interface device.

4. The storage system according to claim 1, wherein the plurality of third-interface devices further include a third third-interface device coupled to the first-memory, and a fourth third-interface device coupled to the second-memory, the second root port is linked to the third third-interface device instead of being linked to the first third-interface device, and the fourth root port is linked to the fourth third-interface device instead of being linked to the second third-interface device.

5. The storage system according to claim 1, wherein the first-memory is divided into a first first-memory and a second first-memory, the second-memory is divided into a first second-memory and a second second-memory, the first third-interface device is coupled to the first first-memory, the second third-interface device is coupled to the first second-memory, the plurality of third-interface devices further include a third third-interface device coupled to the second first-memory, and a fourth third-interface device coupled to the second second-memory, the third root port is linked to the third third-interface device instead of being linked to the first third-interface device, and is linked to the fourth third-interface device instead of being linked to the second third-interface device, the second root port is further linked to the fourth third-interface device, and the fourth root port is further linked to the third third-interface device.

6. The storage system according to claim 5, wherein when a write request is received from the higher level device, the first processor, which is coupled to the first root port, controls the transfer of data, which is received from the higher-level device, to each of the first first-memory and the first second-memory from the first-interface device, in accordance with controlling the first-interface device, the first third-interface device and the second third-interface device, the first processor, which is coupled to the second root port, controls the transfer of data, which is stored in either the first first-memory or the second second-memory, to the second-interface device from either the first first-memory or the second second-memory, in accordance with controlling the second-interface device, the first third-interface device and the fourth third-interface device, the second processor, which is coupled to the third root port, controls the transfer of data, which is received from the higher-level device, to each of the second first-memory and the second second-memory from the first-interface device, in accordance with controlling the first-interface device, the third third-interface device and the fourth third-interface device, and the second processor, which is coupled to the fourth root port, controls the transfer of data, which is stored in either the second first-memory or the first second-memory, to the second-interface device from either the second first-memory or the first second-memory, in accordance with controlling the second-interface device, the second third-interface device and the third third-interface device.

7. The storage system according to claim 1, wherein mapping information that denotes which interface device is linked to which root port is stored in the storage system for each root port, all of the first- through third-interface devices are physically coupled to each of the plurality of root ports, a case where the root port and the interface device are linked signifies that the root port and the interface device are also logically coupled, a case where the root port and the interface device are not linked signifies that the root port and the interface device are not logically coupled, and whether or not the root port and the interface device are logically coupled is determined on the basis of the mapping information.

8. The storage system according to claim 7, wherein when a third processor and a fourth processor are added to the plurality of processors, and a fifth root port and a sixth root port, which are coupled to the third processor, and a seventh root port and an eighth root port, which are coupled to the fourth processor, have been further added, any of the plurality of processors changes the mapping information so that the logical connection relationship between the fifth through eighth root ports and the first- through third-interface devices becomes the same as the logical connection relationship between the first through fourth root ports and the first- through third-interface devices.

9. The storage system according to claim 7, further comprising a management device for setting the mapping information, wherein when a third processor and a fourth processor are added to the plurality of processors, and a fifth root port and a sixth root port, which are coupled to the third processor, and a seventh root port and an eighth root port, which are coupled to the fourth processor, have been further added, the management device changes the mapping information so that the logical connection relationship between the fifth through eighth root ports and the first-through third-interface devices becomes the same as the logical connection relationship between the first through fourth root ports and the first- through third-interface devices.

10. The storage system according to claim 8, wherein any of the plurality of processors changes the mapping information while ensuring a state in which any of the processors is able to control both a data transfer between a first interface-device and a memory and a data transfer between a second-interface device and the memory.

11. The storage system according to claim 1, wherein the second interface device controls the write data transferred by the first-processor from the first-memory or transferred by the second-processor from the second-memory to be stored in the storage device.

12. A method of controlling a storage system which has a storage device in which data that is to be read or written from a higher-level device is stored, a plurality of memories in which either write-targeted data received from the higher-level device or read-targeted data read out from the storage device is temporarily stored, a first-interface device, which is coupled to the higher-level device, and which controls input/output of data to/from the higher-level device, a second-interface device, which is coupled to the storage device, and which controls input/output of data to/from the storage device, a plurality of third-interface devices, which are coupled to the plurality of memories, and which control the input/output of data to/from the plurality of memories, a plurality of processors, each of which controls data transfer between the first-interface device and said memory and/or between the second-interface device and said memory in accordance with controlling any one or more of the first-through third-interface devices, a plurality of root ports, where each of the root ports is coupled to any one of the plurality of processors, and is linked to one of the first through third-interface devices, which is controlled by the respectively coupled processor, where the plurality of root ports include a first root port, a second root port, a third root port and a fourth root port, the plurality of memories include a first-memory and a second-memory, the plurality of processors include a first processor and a second processor, the plurality of third-interface devices include a first third-interface device that is coupled to the first-memory, and a second third-interface device that is coupled to the second-memory, the first root port is linked to the first-interface device, the first third-interface device and the second third-interface device, and coupled to the first processor, the second root port is linked to the second-interface device and the first third-interface device, but not linked to the second third-interface, and coupled to the first processor, the third root port is linked to the first-interface device, the first third-interface device and the second third-interface device, and coupled to the second processor, the fourth root port is linked to the second-interface device and the second third-interface device, but not linked to the first third-interface, and coupled to the second processor, the first-interface device has a function unit for controlling the input/output of data accessible from the first root port and a function unit for controlling the input/output of data accessible from the third root port, the second interface device has a function unit for controlling the input/output of data accessible from the second root port and a function unit for controlling the input/output of data accessible from the fourth root port, the first third-interface device has a function unit for controlling the input/output of data accessible from the first root port, a function unit for controlling the input/output of data accessible from the second root port and a function unit for controlling the input/output of data accessible from the third root port, the second third-interface device has a function unit for controlling the input/output of data accessible from the first root port, a function unit for controlling the input/output of data accessible from the third root port and a function unit for controlling the input/output of data accessible from the fourth root port, the method comprising:

transferring by the first-processor to the first third-interface device and the second third-interface device write data received by the first interface device, transferring by the second-processor to the first third-interface device and the second third-interface device write data received by the first interface device, storing by the first third-interface device the write data in the first-memory with the corresponding function unit, storing by the second third-interface device stores the write data in the second-memory with the corresponding function unit, transferring by the first-processor the write data stored in the first-memory to the second interface device, and transferring by the second-processor the write data stored in the second-memory to the second interface device.

13. The method according to claim 12, further comprising:

controlling by the second interface device the write data transferred by the first-processor from the first-memory or transferred by the second-processor from the second-memory to be stored in the storage device.

* * * * *